(12) United States Patent
Coffield

(10) Patent No.: US 9,156,211 B2
(45) Date of Patent: Oct. 13, 2015

(54) APPARATUS AND METHOD FOR MANUFACTURING A LOAD BEARING FABRIC SURFACE

(75) Inventor: Timothy P. Coffield, Grand Rapids, MI (US)

(73) Assignee: Illinois Tool Works Inc., Glenview, IL (US)

( * ) Notice: Subject to any disclaimer, the term of this patent is extended or adjusted under 35 U.S.C. 154(b) by 93 days.

(21) Appl. No.: 13/377,599

(22) PCT Filed: May 13, 2010

(86) PCT No.: PCT/US2010/034661
§ 371 (c)(1),
(2), (4) Date: Dec. 12, 2011

(87) PCT Pub. No.: WO2010/144211
PCT Pub. Date: Dec. 16, 2010

(65) Prior Publication Data
US 2012/0086144 A1    Apr. 12, 2012

Related U.S. Application Data

(60) Provisional application No. 61/186,416, filed on Jun. 12, 2009.

(51) Int. Cl.
*B29C 70/76* (2006.01)
*A47C 7/28* (2006.01)
(Continued)

(52) U.S. Cl.
CPC ............... *B29C 70/76* (2013.01); *A47C 7/282* (2013.01); *B29C 70/56* (2013.01); *B29L 2031/771* (2013.01)

(58) Field of Classification Search
CPC ........ B29C 55/06; B29C 55/08; B29C 70/76; B29C 70/56; B29L 2031/771; A47C 7/282
USPC ........ 425/111, 383, 192 R, 112, 66; 264/257, 264/290.2, 288.4
See application file for complete search history.

(56) References Cited

U.S. PATENT DOCUMENTS 2,759,217 A * 8/1956 Peterson ..................... 38/102.4
3,391,635 A    7/1968 Matheus
(Continued)

FOREIGN PATENT DOCUMENTS

| EP | 1752274 A1 | 2/2007 |
|---|---|---|
| JP | 4085013 A | 3/1992 |
| WO | 2005046952 A2 | 5/2005 |

OTHER PUBLICATIONS

ISR for PCT/US2010/0346661 dated Feb. 25, 2011.
(Continued)

*Primary Examiner* — Nahida Sultana
(74) *Attorney, Agent, or Firm* — Levenfeld Pearlstein, LLC

(57) ABSTRACT

An apparatus for forming molded edges on opposite sides of a load bearing surface including a stretching assembly integrated into a molding assembly. The stretching assembly may include localized fabric clamps that leave the center region of the fabric free (e.g. not clamped) through the process. The clamps may be arranged so that once extended to stretch the fabric, the fabric is held by the clamps in the appropriate position for molding. The fabric may be held so that opposed edges terminate in the mold cavities. The mold parts may cooperatively define two spaced apart mold cavities, and may include a mold pocket to provide space to store excess fabric. The fabric may be held against the surface of the mold cavity during the molding process, for example, using hold-down pins and special gate configurations. The molding apparatus may include an alternative stretching assembly configured to provide different amounts of stretch to different portions of the fabric blank. The alternative stretching assembly may include additional intermediate clamps.

12 Claims, 19 Drawing Sheets

(51) Int. Cl.
    *B29C 70/56*     (2006.01)
    *B29L 31/00*     (2006.01)

(56) References Cited

U.S. PATENT DOCUMENTS

| | | | |
|---|---|---|---|
| 3,466,706 A | | 9/1969 | Asano |
| 3,482,343 A | | 12/1969 | Hamu |
| 3,635,640 A | * | 1/1972 | Wood ........................... 425/445 |
| 3,880,561 A | | 4/1975 | Ferro |
| 4,022,091 A | | 5/1977 | Frigo |
| 4,087,226 A | * | 5/1978 | Mercer ......................... 425/397 |
| 4,116,892 A | * | 9/1978 | Schwarz ........................ 521/62 |
| 4,269,579 A | | 5/1981 | Thomas |
| 4,442,772 A | | 4/1984 | Bubley |
| 5,051,225 A | * | 9/1991 | Hommes et al. ........... 264/288.4 |
| 5,235,908 A | | 8/1993 | Froelicher et al. |
| 5,271,171 A | | 12/1993 | Smith |
| 5,307,609 A | * | 5/1994 | Kurata et al. .................... 53/556 |
| 5,679,301 A | | 10/1997 | Miklas et al. |
| 6,059,368 A | | 5/2000 | Stumpf et al. |
| 6,167,603 B1 | | 1/2001 | Zeiler et al. |
| 6,328,548 B1 | | 12/2001 | Salas et al. |
| 6,361,654 B1 | | 3/2002 | Chuang et al. |
| 6,966,606 B2 | | 11/2005 | Coffield |
| 7,128,869 B2 | * | 10/2006 | Habisreitinger et al. ..... 264/510 |
| 7,618,572 B2 | | 11/2009 | Coffield |
| 7,677,873 B2 | * | 3/2010 | Sayers et al. .................. 425/111 |
| 8,066,501 B2 | | 11/2011 | Sayers et al. |
| 2004/0012122 A1 | * | 1/2004 | Nagaoka et al. ........... 264/328.7 |
| 2004/0021247 A1 | * | 2/2004 | Habisreitinger et al. ..... 264/161 |
| 2005/0023729 A1 | * | 2/2005 | Smith et al. ................. 264/288.4 |
| 2007/0035064 A1 | * | 2/2007 | Coffield ........................ 264/257 |
| 2007/0291345 A1 | * | 12/2007 | Kumar et al. ................. 359/241 |
| 2009/0104300 A1 | * | 4/2009 | Hiroshi et al. ................ 425/110 |
| 2009/0250838 A1 | * | 10/2009 | Sano et al. .................... 264/291 |
| 2011/0020488 A1 | * | 1/2011 | Park et al. ..................... 425/383 |
| 2011/0037187 A1 | * | 2/2011 | Winzinger et al. ............. 264/39 |
| 2012/0049408 A1 | * | 3/2012 | Okamoto ...................... 264/255 |
| 2012/0280424 A1 | * | 11/2012 | Nomura et al. ............... 264/259 |
| 2014/0353872 A1 | * | 12/2014 | Hojo et al. ................. 264/210.1 |

OTHER PUBLICATIONS

Supplementary Eurpoean Search Report for 04794834.4 2307 / 1680265 dated May 6, 2009.

Anonymous, "Method to load material into the upper cavity of a compression mould—by preparing a trim blank with holes that are shaped to accommodate the varying amount of stretch/movement required during the forming/moulding process, etc.", RD419043, Copyright 2005 Derwent Information Ltd., Mar. 10, 1999.

* cited by examiner

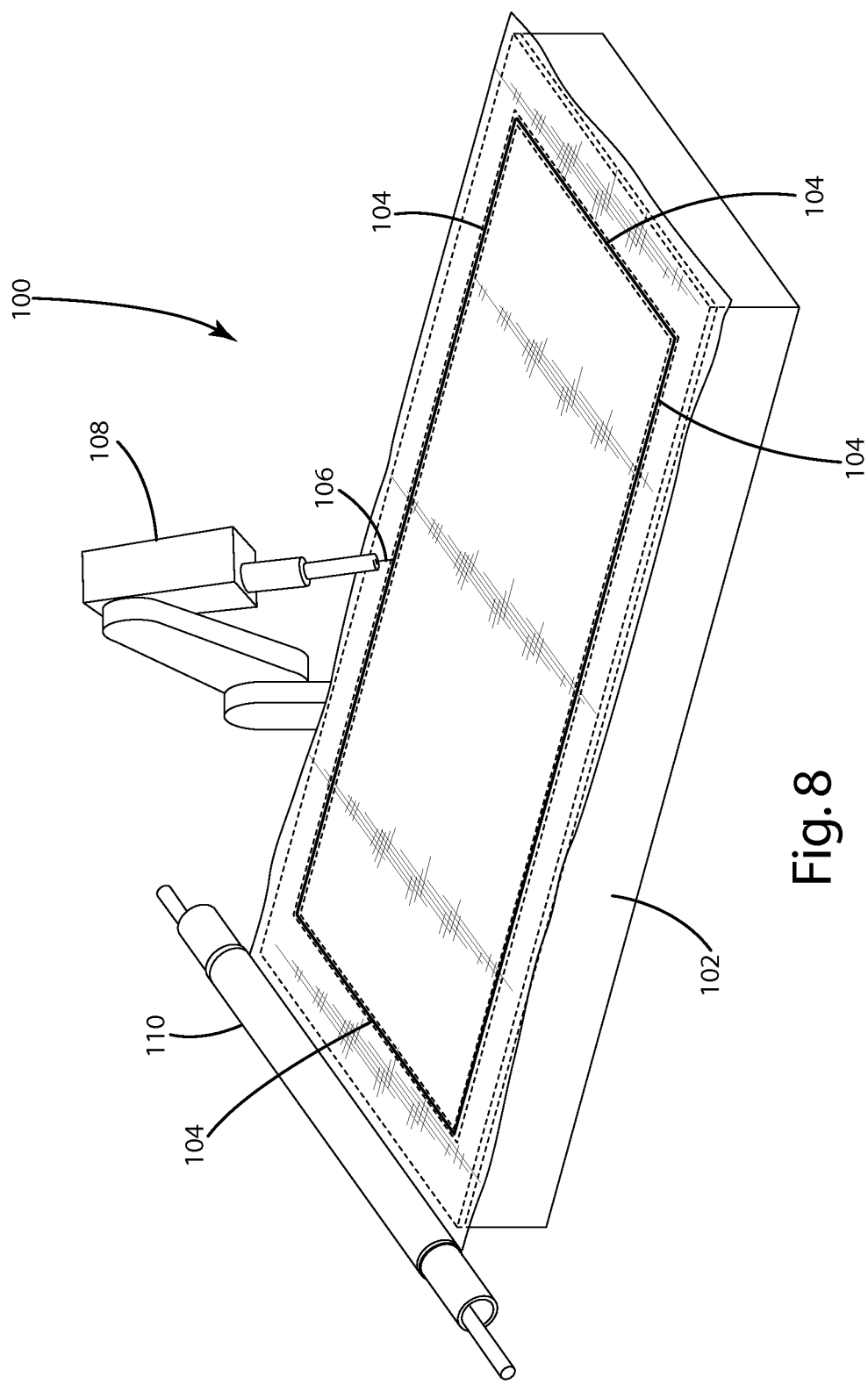

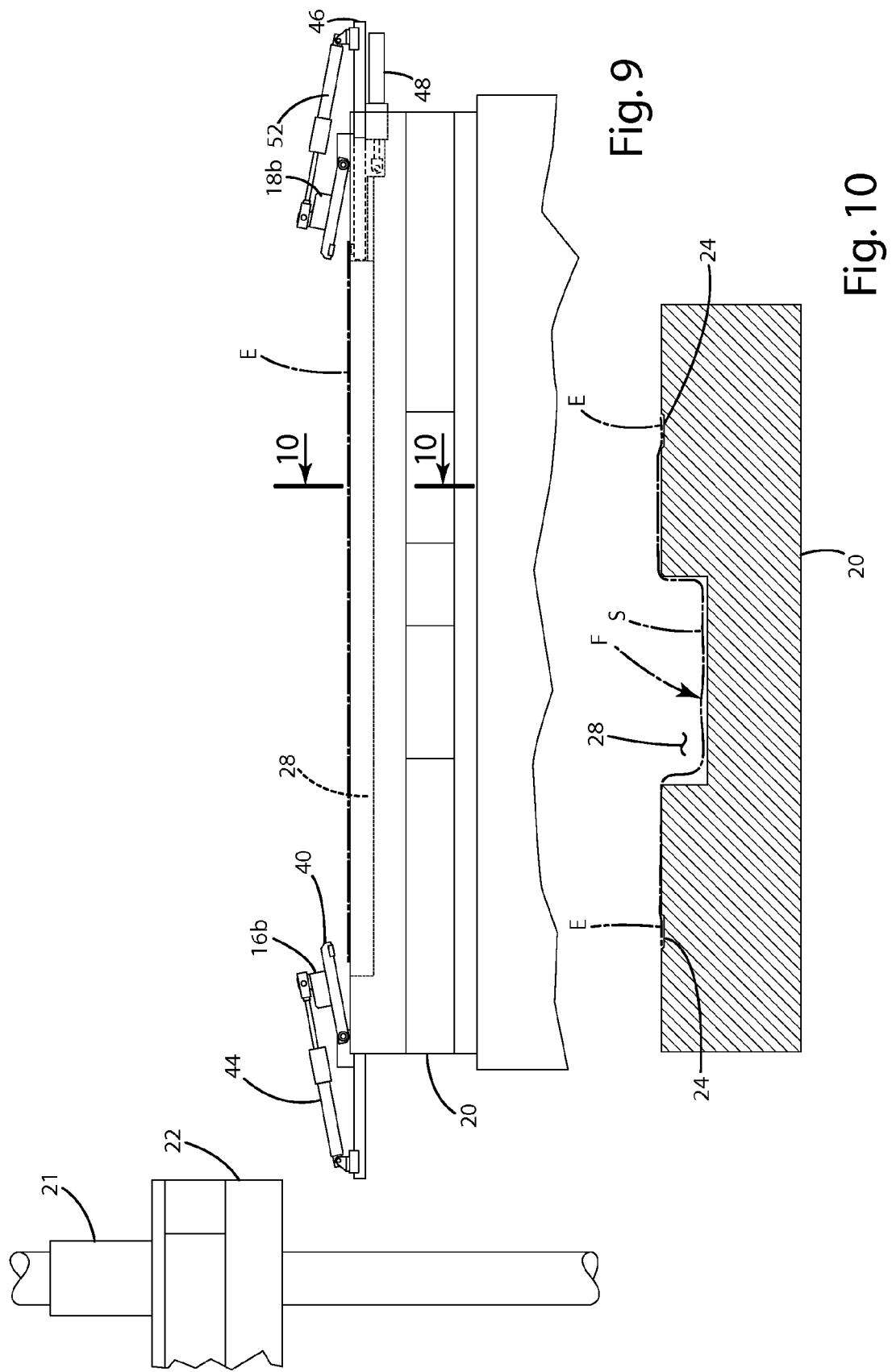

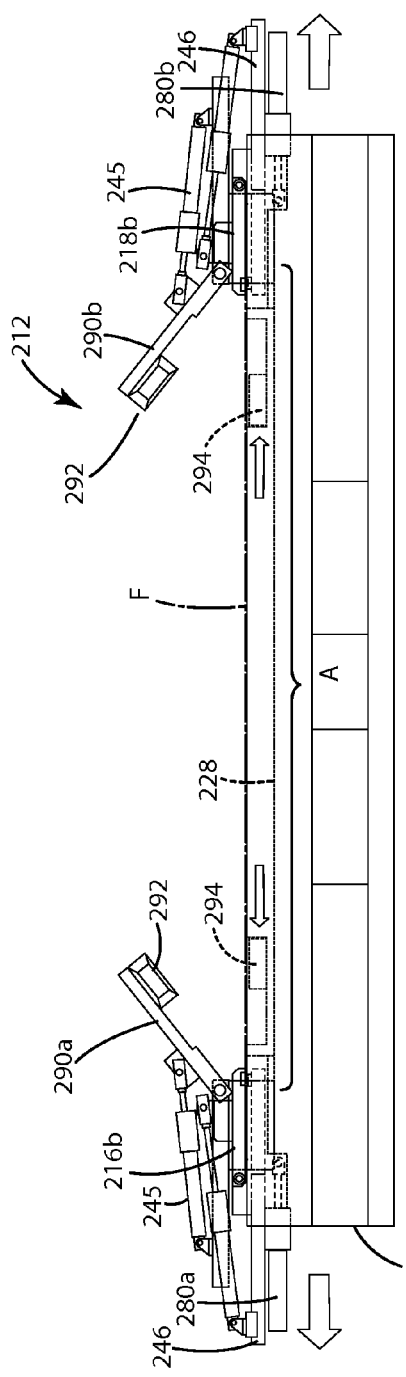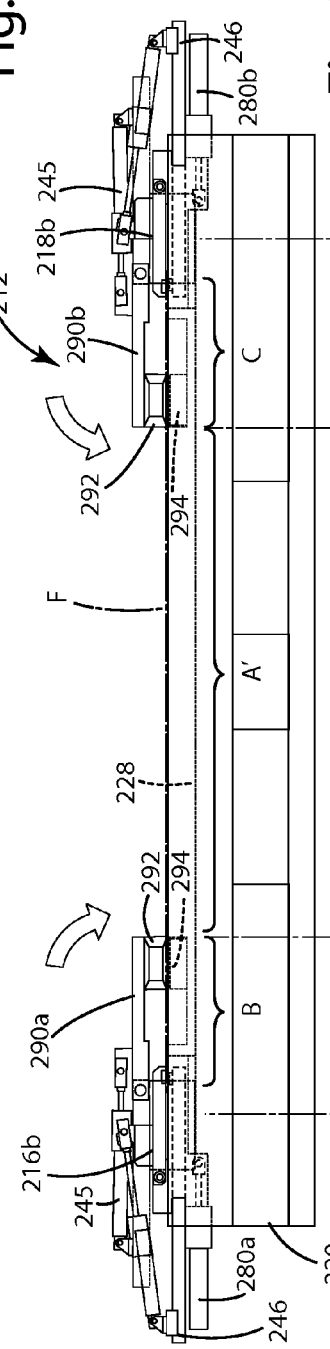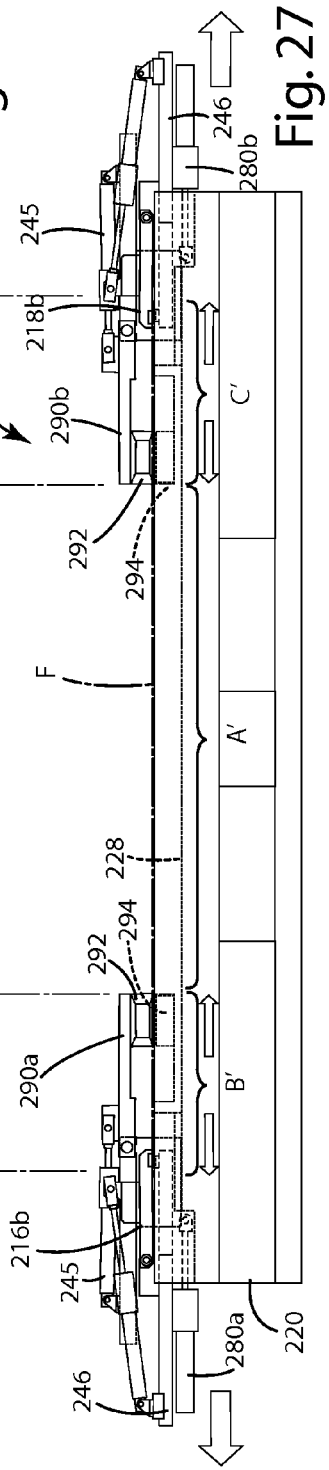

APPARATUS AND METHOD FOR MANUFACTURING A LOAD BEARING FABRIC SURFACE

CROSS REFERENCE TO RELATED APPLICATION

This Non-Provisional Application is national phase of PCT/US2010/034661 filed May 13, 2010, and claims benefit to U.S. Provisional Application Ser. No. 61/186,416 filed Jun. 12, 2009.

FIELD OF THE INVENTION

The present invention is Directed to a method and apparatus for manufacturing a load bearing surface, and more particularly to a method and apparatus for manufacturing a load bearing surface having a load bearing fabric with an integrally molded edge.

BACKGROUND OF THE INVENTION

The development of high tech fabrics has permitted the incorporation of fabric into a wide variety of applications not previously consider appropriate for fabrics. For example, certain high tech fabrics have been developed that incorporate elastomeric elements, such as a weave of multifilament yarns and elastomeric monofilaments. These fabrics provide remarkable load bearing characteristics, while at the same time providing appropriate elasticity to be comfortable as a load bearing fabric in seating applications. These fabrics are now widely used to form the seats and backs of office chairs and other seating structures. To enable attachment of the fabric to a chair seat or other support structure, it is known to mold a mounting component ("carrier") directly onto the fabric. The mounting component is typically molded about the periphery of the fabric to provide a structure that can be mounted to a frame or other support structure. In many applications, it is desirable to mount the fabric to the chair in a stretched (or loaded) condition primarily because the stretched fabric provides more desirable comfort characteristics. The desire to have a loaded fabric complicates the manufacturing process—at least with respect to the process of molding the mounting component onto the fabric.

One known process for manufacturing chair components with a loaded fabric is to stretch the fabric before it is placed in the mold for forming the mounting component. In one known embodiment of this process, the fabric is stretched prior to molding using a stretching machine that is located remotely from the mold. Once stretched, the fabric is shuttled to a loom station where a loom is closed onto the fabric to hold it in the stretched condition. The loom is then moved to the mold and positioned so that the fabric is properly oriented with respect to the mold surfaces. The mold is closed about the fabric while it continues to be held in the stretched position by the loom. Once the molding process is complete, the loom carrying the fabric and attached mounting component are removed from the mold and returned to the loom station. The loom is removed at the loom station and the fabric and attached mounting component are returned to the operator. The assembly is finished, for example, by trimming the excess fabric from the assembly.

A number of other methods are known for forming a molded edge onto a load bearing fabric. In one alternative, the fabric is stretched by the closing action of the mold. In this alternative, the edges of the fabric are held and the mold parts are specially shaped so that movement of the mold parts together causes the fabric to stretch. This process requires a specific amount of stretch to be built into the shape of the mold and does not provide the ability to readily adjust the stretch. In another alternative, hydraulic components are included in the mold. The hydraulic components are moved after the fabric has been closed in the mold to apply the desired amount of stretch. Although providing some benefits, these alternative methods continue to suffer from a variety of problems ranging from high cost to product quality issues.

In another known system for molding a peripheral carrier around a fabric blank, the fabric stretching assembly is integrated into the molding apparatus. The stretching assembly may be disposed about the mold and includes a plurality of clamp assemblies to grip essentially the entire periphery of a fabric blank. The clamp assemblies are selectively movable away from one another on slide assemblies to stretch the blank. When it is desirable to mold a carrier around a generally rectangular fabric blank, the apparatus may include four clamp assemblies and four slide assemblies disposed in a rectangular arrangement outside the mold. The clamp assemblies may grip along the four edges of the rectangular fabric blank. The stretching assembly may include a float plate that is movable with respect to the mold so that the mold does not interfere with the stretching process. The float plate carries the slide assemblies and clamp assemblies and is movable between a stretch position and a mold position. In the stretch position, the float plate is positioned away from the mold so that the fabric is not in contact with any portion of the mold during the stretching process. In the mold position, the float plate is positioned over the mold with the fabric closed between the two mold parts.

SUMMARY OF THE INVENTION

The present invention provides a load bearing surface molding apparatus with a stretching assembly integrated into a molding assembly. The molding apparatus is configured to mold polymeric edges onto opposite edges of a fabric blank while the fabric blank is being held in a stretched condition. In one embodiment, the molding assembly includes two mold parts that close together to define the mold cavities for forming the molded edges. The stretching assembly includes localized fabric clamps disposed adjacent to a mold part. In one embodiment, a first pair of clamps is used to grip one end of the fabric and a second pair of clamps is used to grip the opposite end of the fabric. In one embodiment, the fabric is generally rectangular and the four clamps are positioned toward the four corners of fabric, thereby leaving the center regions of the fabric ungripped on all sides.

In the illustrated embodiment, the clamps are arranged so that once the clamps are extended to stretch the fabric, the fabric is held by the clamps in the appropriate position for molding. The clamps may hold the stretched fabric so that the opposed edges of the fabric upon which the molded edges are to be formed are disposed in the mold cavities. In one embodiment, the fabric may be held so that a pair of opposed edges terminate in the mold cavities. In other embodiments, the fabric may be held so that its opposed edges emerge from the mold cavities so that they can be held between the mold parts. In such embodiments, the distance to which the edges emerge may vary. For example, they may emerge only slightly so that they can be gripped between the mold parts 20 and 22.

In one embodiment, the mold parts cooperatively define two spaced apart mold cavities for forming edges on opposite edges of the fabric. In this embodiment, the distance between the two mold cavities is fixed, thereby providing a mechanism for molding two edges a fixed distance apart from one another. In one embodiment, one of the mold parts includes a mold pocket to provide space to store excess fabric. If it is desirable to mold edges on opposite sides of a fabric that is wider than the distance between the two mold cavities, the edges of the fabric can be moved toward one another to match the distance between the mold cavities and the slack (or excess fabric) that accumulates in the middle of the fabric can be moved into the mold pocket where it will be out of the way when the mold parts close.

In one embodiment, the fabric blank is cut using an ultrasonic head and steel-ruled die. The steel-ruled die is mounted in a cutting table and follows the desired shape of the fabric blank. In use, a section of fabric is placed over the steel-ruled die and the ultrasonic head is energized and moved along the steel-ruled die to precisely and cleanly cut the fabric blank. In one embodiment, the cutting table is a downdraft table, and the downdraft secures the fabric to the table during the cutting operation.

In one embodiment, the fabric is held against the surface of the mold cavity during the molding process. The mold parts may include hold-down pins to assist in holding the fabric against the surface of the mold cavity. The hold-down pins may have an elongated cross-section in the direction of resin flow to reduce turbulence in the resin. The mold parts may also include gates disposed opposite the surface to be held, and may be directed to supply resin to the mold cavity in a direction substantially perpendicularly to the surface to be engaged by the fabric.

In an alternative embodiment, the molding apparatus includes an alternative stretching assembly configured to provide different amounts of stretch to different portions of the fabric blank. In one embodiment, the stretching assembly is configured to provide additional stretch in the end portions of the fabric blank. In this embodiment, the stretching assembly may include corner clamps, plus an additional set of central clamps. In this embodiment, both set of corner clamps may capable of moving to stretch the fabric. The center clamps may be used to secure the central region of the fabric at a first amount of stretch so that additional stretch may be applied to the end regions of the fabric by further moving the corner clamps after the center clamps have been engaged.

This allows stretching to be isolated to different regions of the fabric. For example, it may be desirable to stretch the end portions of the fabric to a greater degree than the center portion of the fabric. This may be useful for aesthetic or functional reasons. In this embodiment, the fabric is stretched tighter at the top and bottom leading edges (where fabric is not attached) to reduce the possibility that the fabric will wrinkle. If one-zone stretching is applied (as described above) and the fill yarn is stretched throughout the entire fabric to the degree desired to address wrinkling for top/bottom free edges, the sitting region (e.g. central region) could be overly stiff for some applications.

The present invention provides a simple and effective manufacturing apparatus for molding a polymeric edge onto a load bearing fabric. The use of localized clamps reduces the likelihood of the fabric edges becoming "potato chipped" when stretched. As a result, the present invention provides a clean straight fabric edge that can be located by the stretching assembly with precision. For example, a straight and clean fabric edge can be positioned to terminate within a mold cavity or just outside a mold cavity. The use of a mold pocket allows molded edges to be formed on fabrics of different widths. The magnets may be used to help retain any excess fabric in the mold pocket out of the way of moving parts. In those embodiments in which it is desirable to hold the fabric against the mold surface during molding, the hold-down pins and gate specifications can be tailored to help retain the fabric on the mold surface. In the alternative "two-zone" embodiment, the stretching assembly is capable of applying different amounts of stretch to different regions of the fabric. This can improve the performance of the finished part in certain applications where a single amount of stretch over the entire fabric is not desired.

Other features and advantages of the inventions will become apparent to those skilled in the art upon review of the following detailed description, claims and drawings in which like numerals are used to designate like features.

BRIEF DESCRIPTION OF THE DRAWINGS

FIG. 8 is a perspective view of the fabric cutting assembly.

FIG. 9 is a front view of the apparatus.

FIG. 10 is a cross-sectional view taken along line 10-10 of FIG. 9.

FIG. 25 is a front view of the alternative stretching assembly with the center clamps open and the corner clamps closed and extended a first distance.

FIG. 26 is a front view of the alternative stretching assembly with the center clamps closed and the corner clamps closed and extended a first distance.

FIG. 27 is a front view of the alternative stretching assembly with the center clamps closed and the corner clamps extended a second distance.

Figure 1:
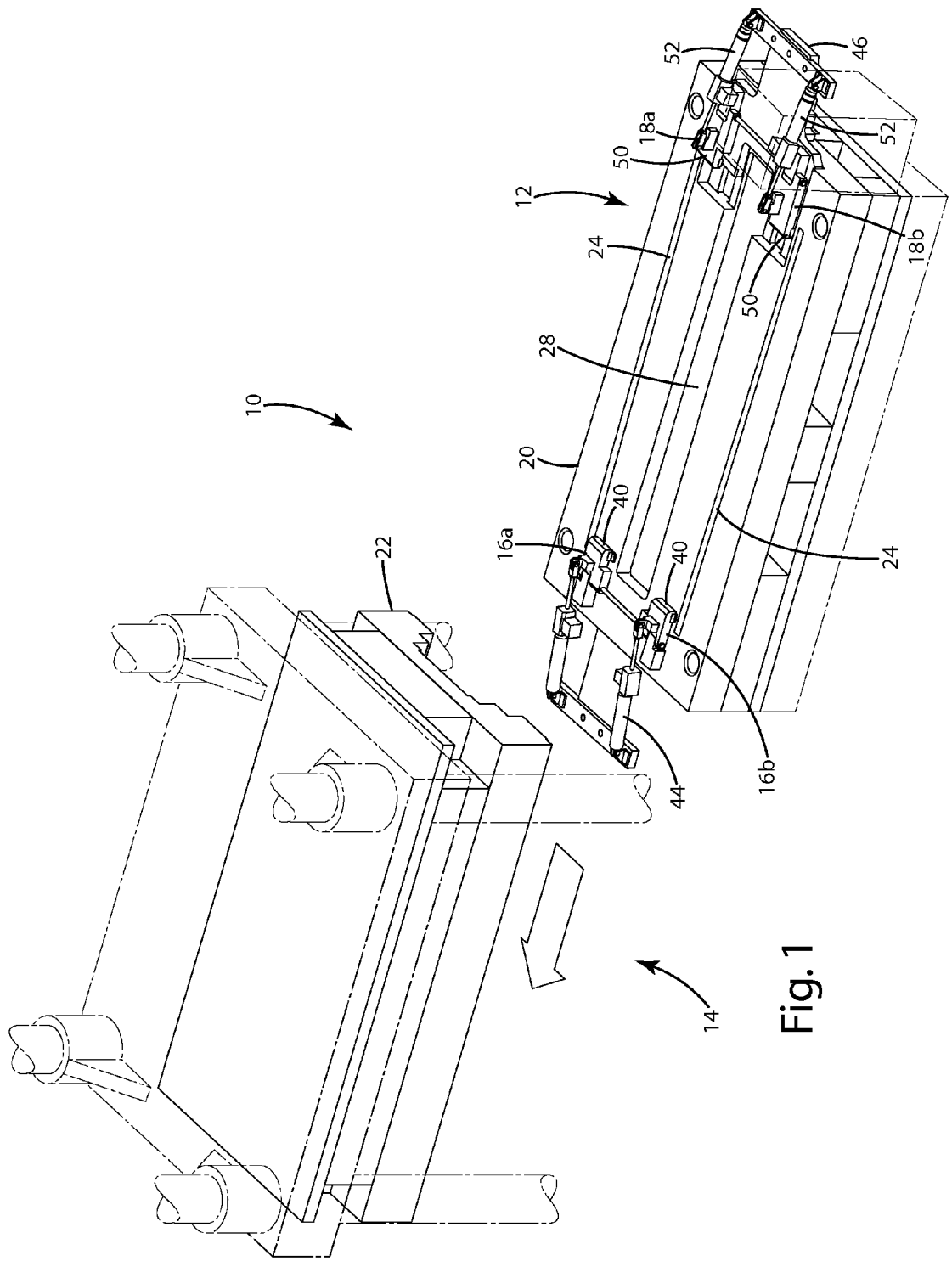
FIG. 1 is a perspective view of a load bearing surface molding apparatus in accordance with an embodiment of the present invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof

DETAILED DESCRIPTION OF THE PREFERRED EMBODIMENTS

A load bearing surface molding apparatus 10 in accordance with one embodiment of the present invention is shown in FIG. 1. In general, the apparatus 10 includes a stretching assembly 12 integrated into a molding assembly 14. The stretching assembly 12 stretches and holds the fabric F while a molded edge is formed molded directly onto the edge E of the fabric F by the molding assembly 14. The molded edges (or "carriers") may be used to mount the load bearing fabric to a support structure. In one embodiment, two edges are molded along opposite sides of the fabric. However, the number and position of edges may vary. In this embodiment, the finished part is intended for use as the support surface in an office chair. More specifically, the single finished part forms the seat and back portions of the chair. The two edges are fitted into channels in opposed sides of a frame under tension so that the fabric is firmly suspended over a void between the opposed frame members. The amount of tension in the assembly chair is dictated in part by the spacing between the opposed frame members and the amount of fabric disposed between the molded edges.

Figure 2:
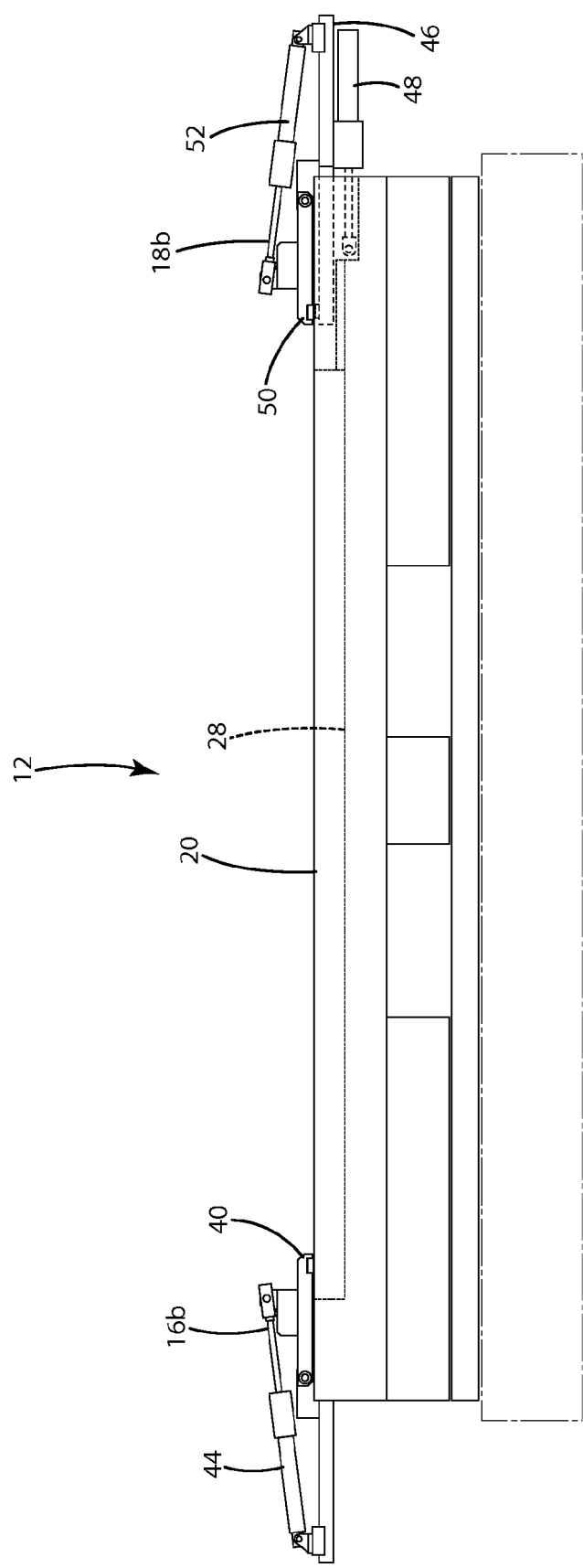
FIG. 2 is a front view of the stretching assembly on a mold part.
Figure 3:
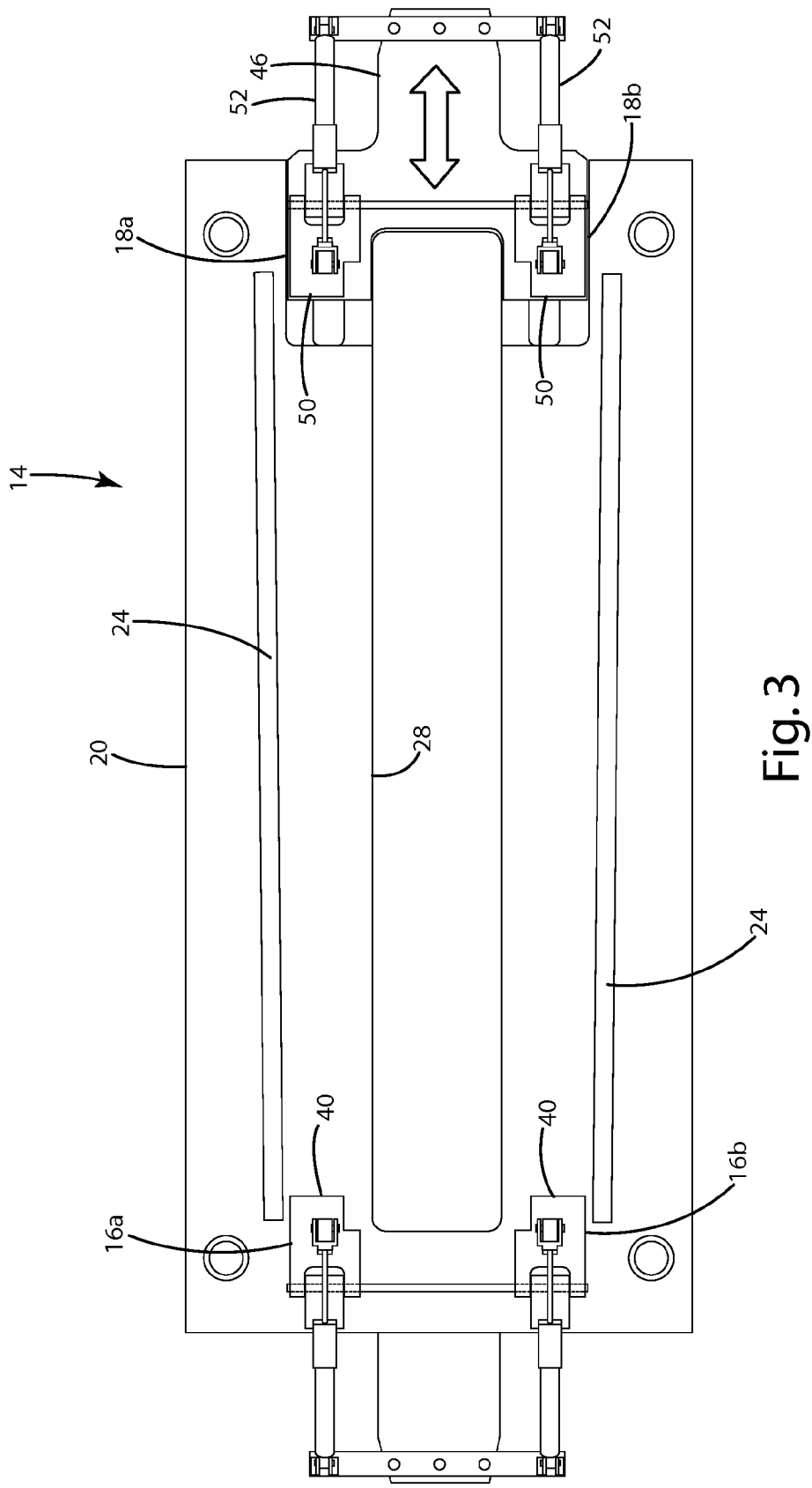
FIG. 3 is a top view of the stretching assembly on a mold part.
Figure 12:
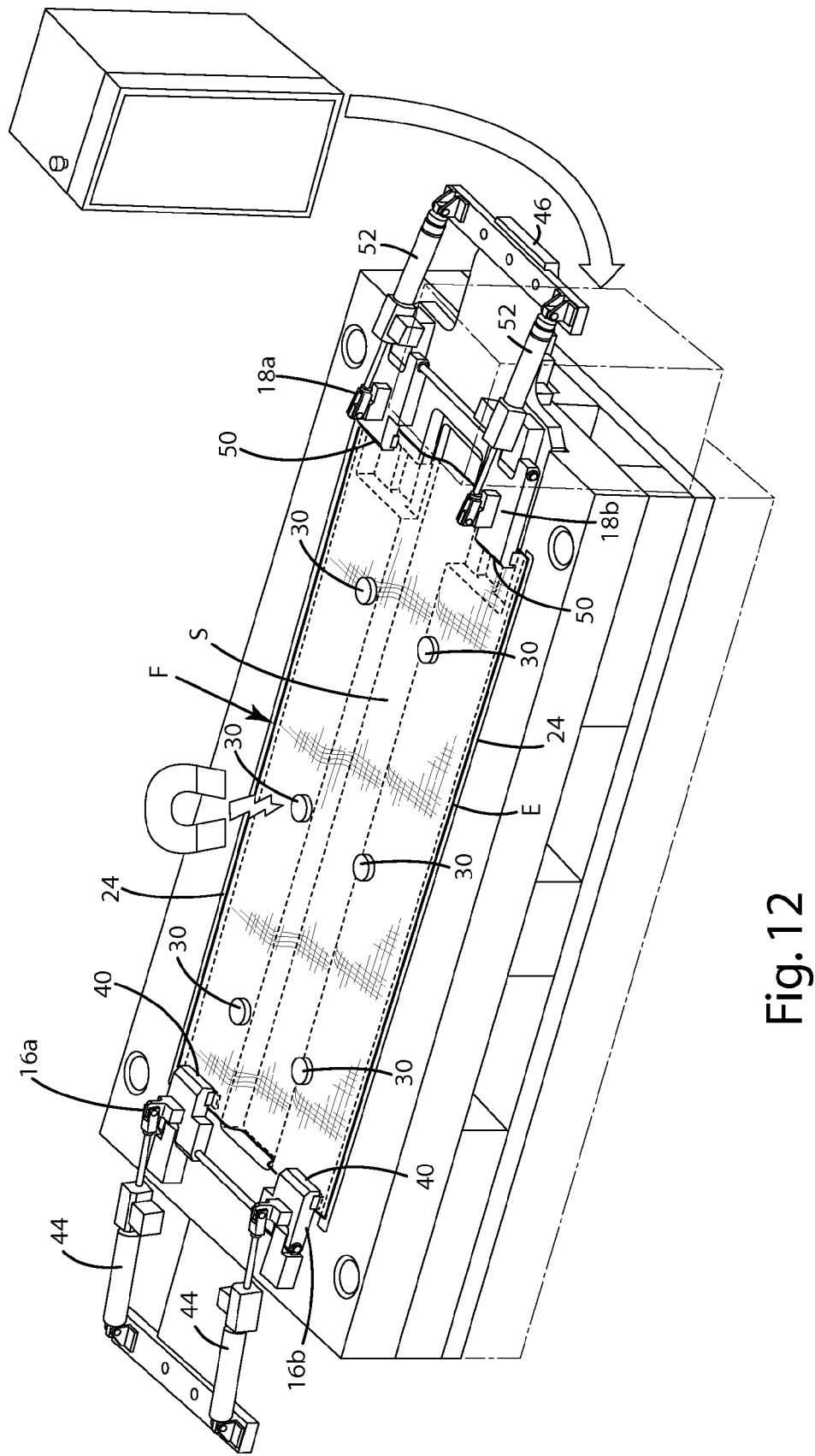
FIG. 12 is a perspective view of the stretching assembly and mold part with the fabric stretched and the magnets in place.
Figure 18:
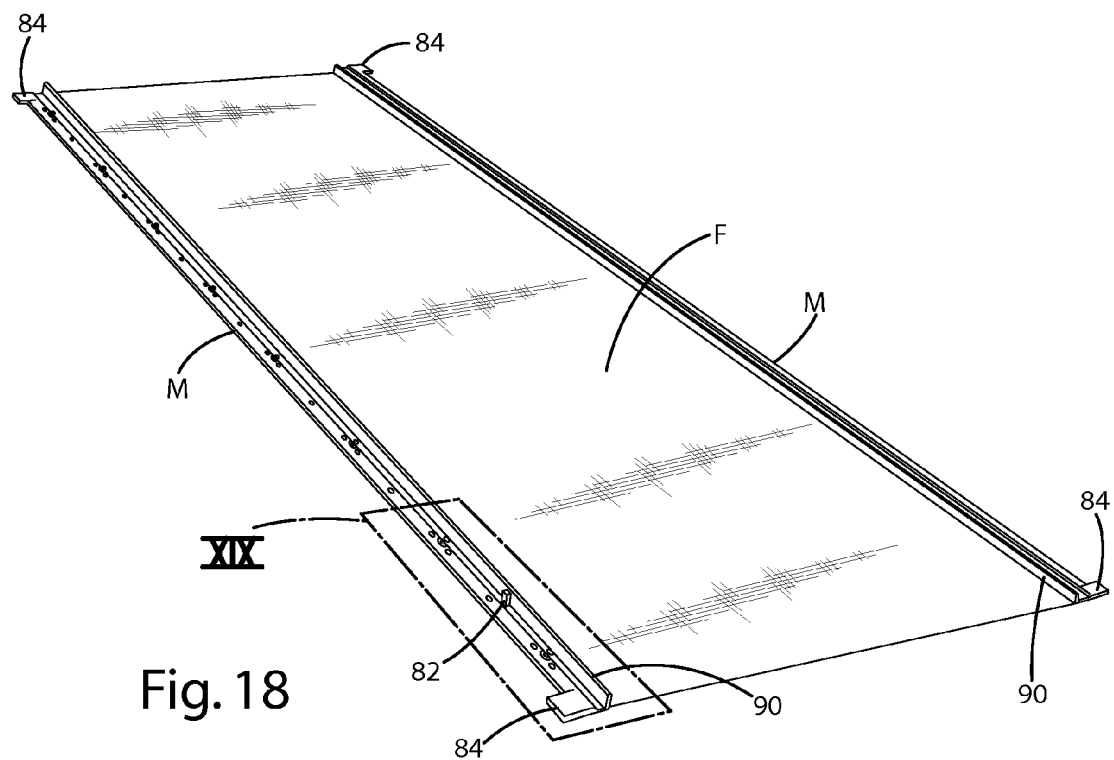
FIG. 18 is a perspective view of a finished part removed from the apparatus.

Referring now to FIGS. 2-3 and 12, the stretching assembly 12 includes clamps 16a-b and 18a-b that grip, stretch and hold the fabric F. The clamps 16a-b and 18a-b are positioned so that the edge E of the stretched fabric F will be disposed within the mold cavity 24 (described below). Accordingly, an edge molded within the mold cavity will be integrally formed onto the edge of the fabric F as shown in FIG. 18.

The clamps 16a-b and 18a-b grip and stretch the fabric F from opposite ends and are operated to apply stretch to the fabric F in one direction. The stretching mechanism includes a plurality of clamps that are spaced apart along the edge to be held during stretching. In one embodiment, a first pair of clamps 16a-b is used to grip one end of the fabric F and a second pair of clamps 18a-b is used to grip the opposite end of the fabric. In one embodiment, the fabric F is generally rectangular and four clamps 16a-b and 18a-b are positioned toward the four corners of fabric.

Figure 4:
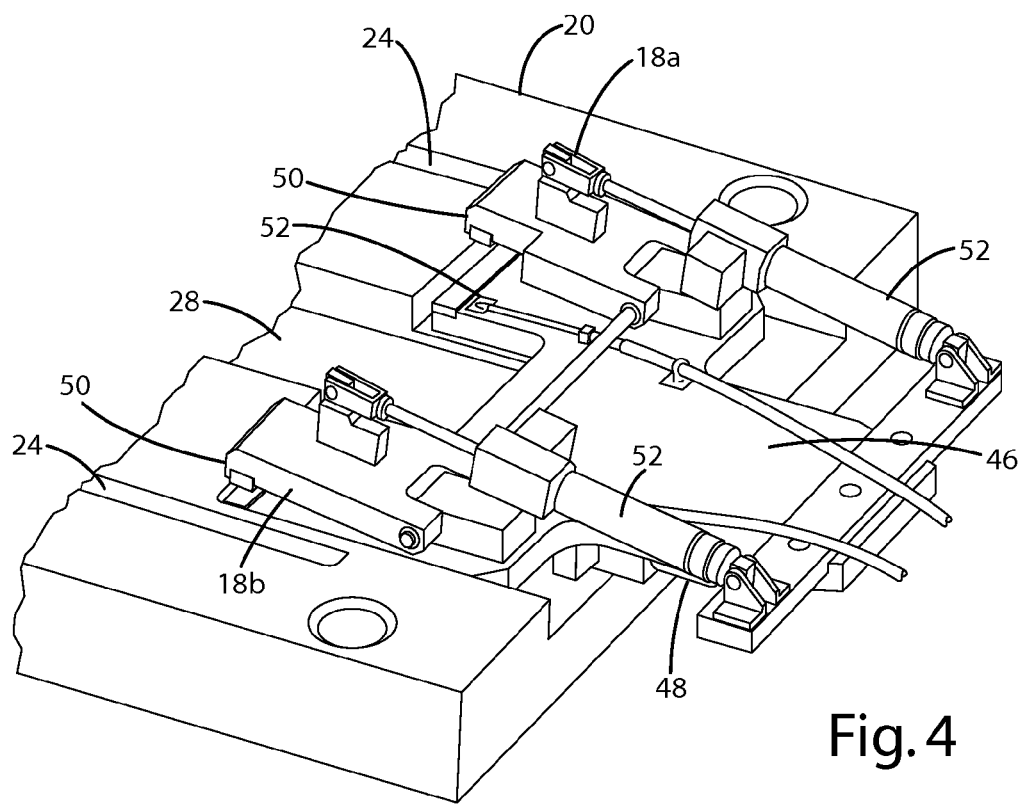
FIG. 4 is a perspective view of the movable clamps in the open and retracted position.
Figure 5:
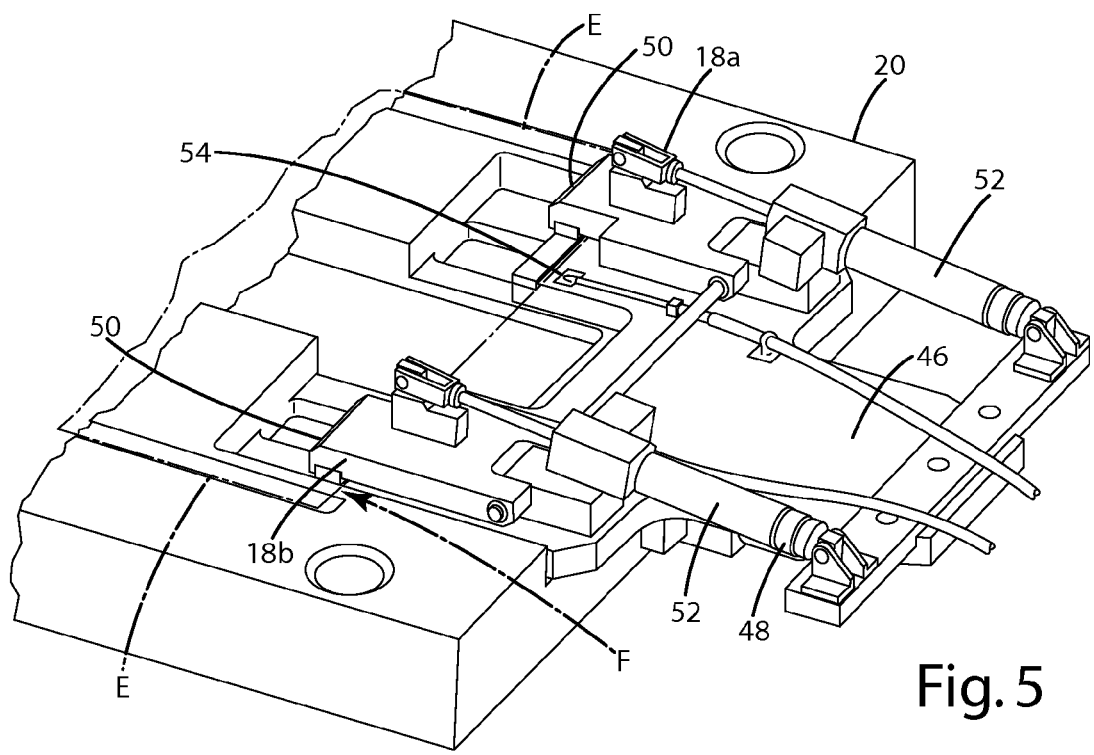
FIG. 5 is a perspective view of the movable clamps in the closed and extended position.
Figure 6:
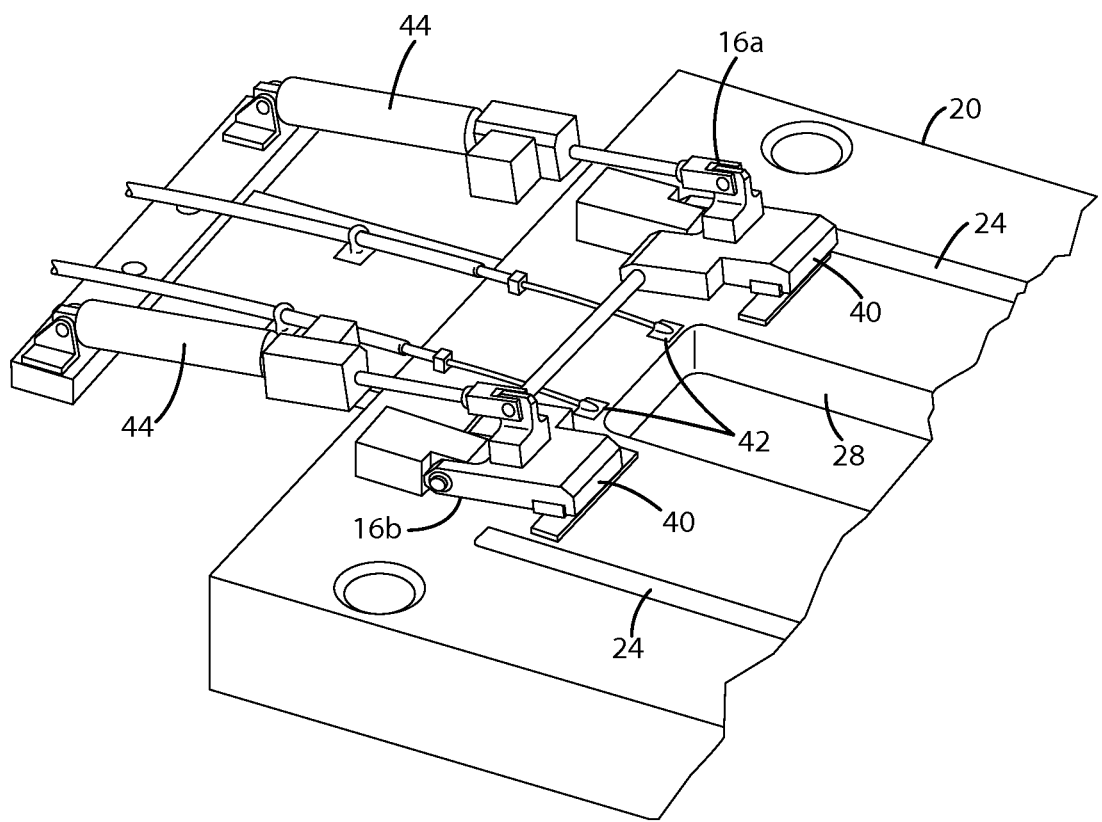
FIG. 6 is a perspective view of the stationary clamps.
Figure 21:
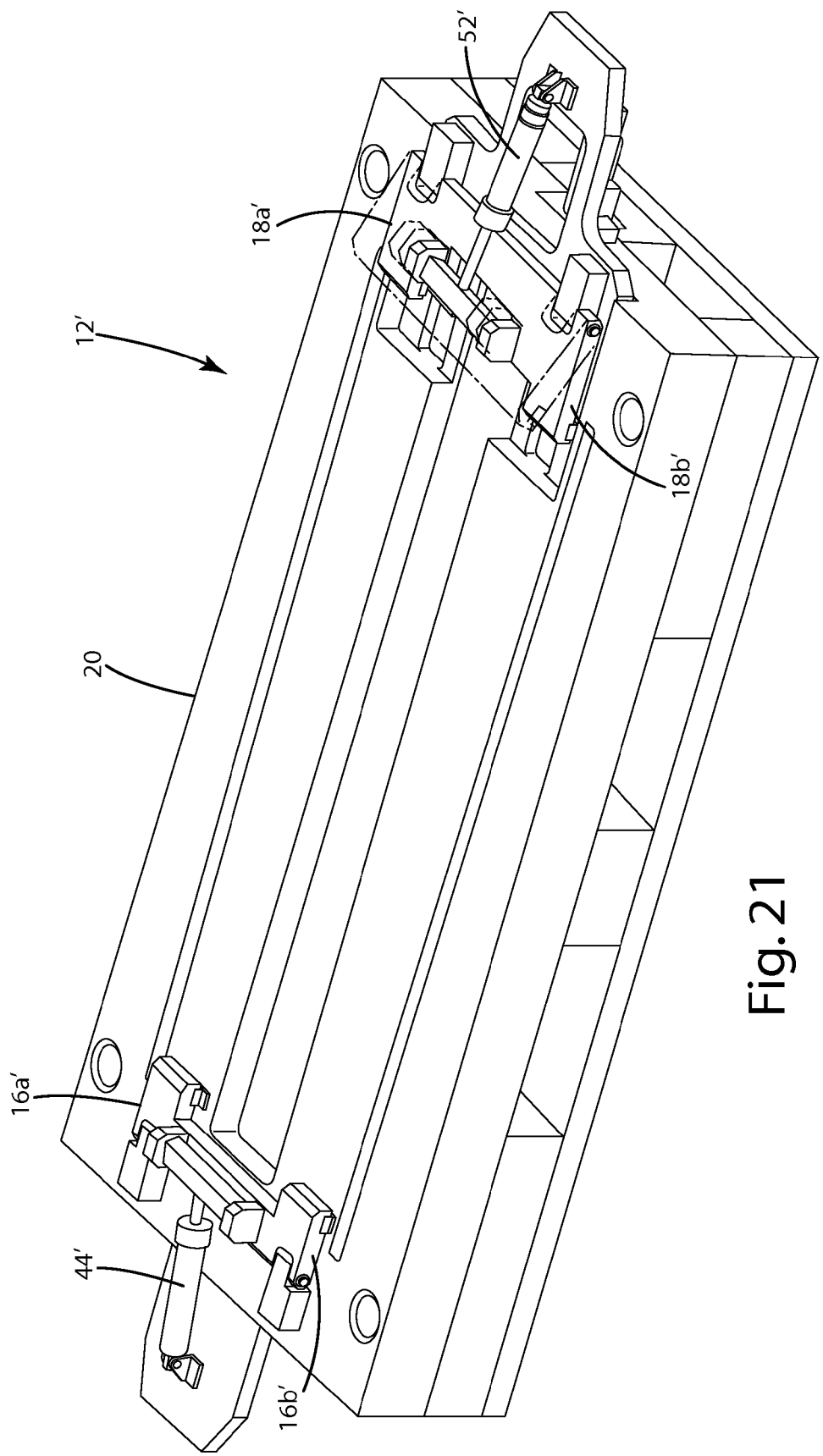
FIG. 21 is a perspective view of an alternative embodiment in which the individual clamps in each clamp pair are coupled together and actuated together.

In this embodiment, clamps 16a-b are stationary clamps in the sense that they are not moved to apply stretch to the fabric (See FIG. 6). These clamps 16a-b are mounted directly or indirectly to mold part 20. The clamps 16a-b each include a jaw 40 that is opened and closed using an actuator 44, such as a hydraulic or pneumatic cylinder. In the embodiment of FIGS. 1-6, each clamp 16a-b is operated by a separate cylinder 44, which may facilitate fabric F loading by allowing an operator to clamp one corner of the fabric F at a time. Referring again to FIG. 6, each clamp 16a-b may include a separate switch 42 for operating the actuator. In the illustrated embodiment, the switches 42 are disposed adjacent the corresponding clamp 16a-b so that an operator can operate the switch 42 with a finger while continuing to hold the fabric F in the correct position with two hands. Although separately opened/closed in this embodiment, the two stationary clamps 16a-b' may alternatively be opened/closed using a single hydraulic or pneumatic cylinder. For example, in the alternative stretching assembly 12' shown in FIG. 21, the two clamps 16a-b' are joined together so that they move as one when cylinder 44' is extended and retracted.

In the illustrated embodiment, clamps 18a-b are movable so that they can apply stretch to the clamped fabric F. As perhaps best shown in FIGS. 4 and 5, the movable clamps 18a-b are mounted to a slide 46. The slide 46 is movably mounted to mold part 20 so that it can be selectively moved to simultaneously move clamps 18a-b toward or away from stationary clamps 16a-b. The stretching apparatus 14 may include a stretching actuator 48 for provide automated motion of the slide 46 and consequently the movable clamps 18a-b. The stretching actuator 48 may be a hydraulic or pneumatic cylinder 48 that can be selectively extended to apply the desired amount of stretch the fabric F. The clamps 18a-b each include a jaw 50 that is opened and closed (compare FIGS. 4 and 5) using an actuator 52, such as a hydraulic or pneumatic cylinder. In the embodiment of FIGS. 4 and 5, each clamp 18a-b is operated by a separate cylinder 52. Each clamp 18a-b may include a separate switch 54 for operating the corresponding actuator 52. Although only one switch 54 is visible in FIGS. 4 and 5, a second switch (not shown) is located adjacent to clamp 18b. In the illustrated embodiment, the switches 54 are disposed adjacent the corresponding clamp 18a-b so that an operator can operate the switch 54 with a finger while continuing to hold the fabric F in the correct position with two hands. As with stationary clamps 16a-b, the two movable clamps 18a-b' may alternatively be joined together and opened/closed using a single hydraulic or pneumatic cylinder 52' (See FIG. 21).

The corner clamps 16a-b and 18a-b draw the fabric's encapsulated edges E straight; allowing clean encapsulation of the finished edges, which do not need trimming and includes the type of consistent edge desired to fit inside a tightly controlled slot in frame. Conventional processes typically involve clamping the whole edge of the fabric, which has been determined to cause the adjacent edges of the fabric to "hour glass." Because the adjacent edges of the fabric F are the edges along which the molded edge is to be formed, the "hour glassing" can interfere with the ability to mold a straight, clean edge onto the fabric F. In some application, the risk of "hour-glassing" can be further reduced by introducing a small amount of slack in the fabric F between the clamps 16a-b and 18a-b on each gripped edge.

Figure 13:
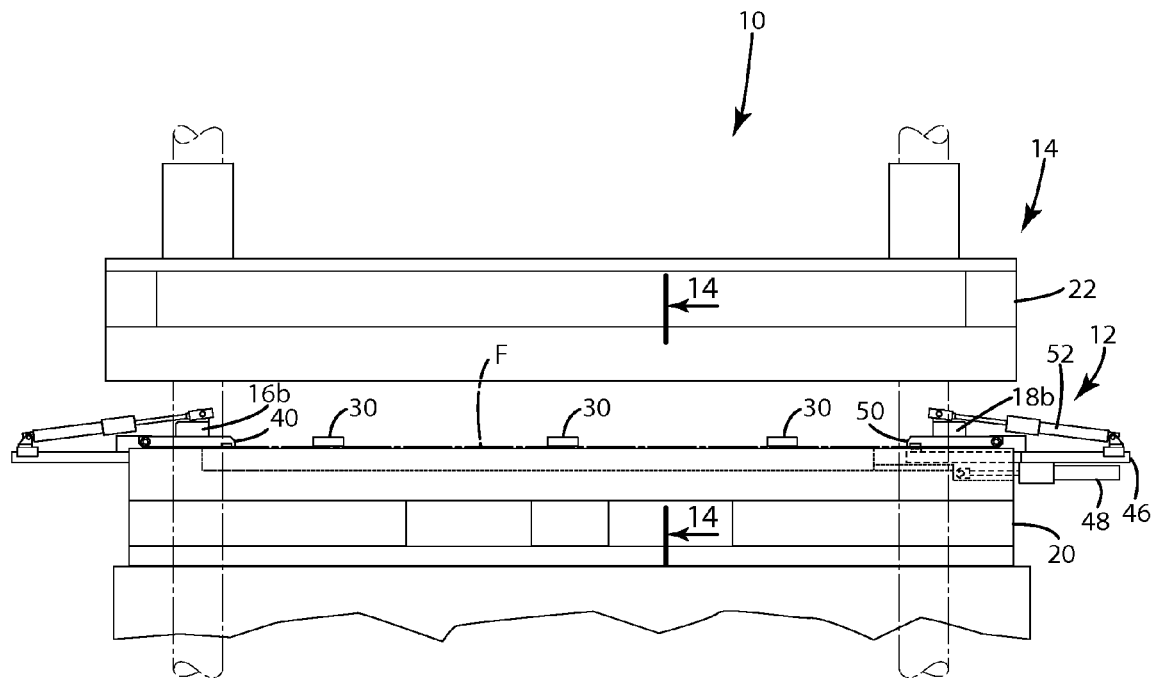
FIG. 13 is a front view of the apparatus showing the mold part carrying the stretching assembly shuttled under the vertical press and associated mold part.
Figure 15:
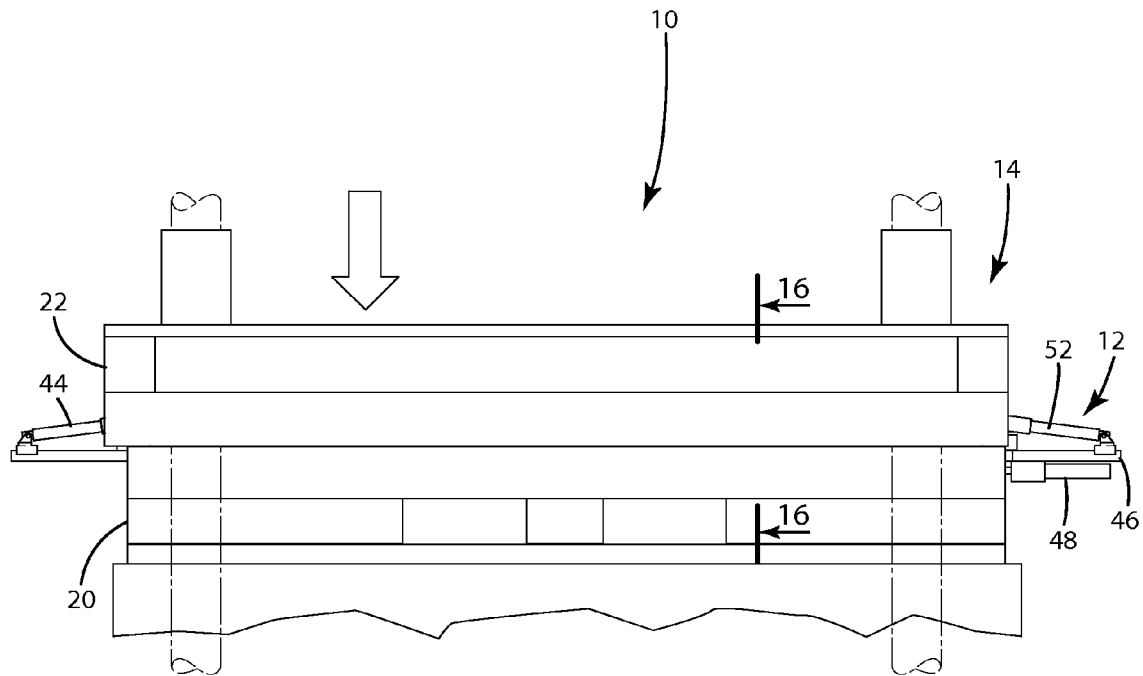
FIG. 15 is a front view of the apparatus showing the molding assembly closed.

The molding assembly 14 of the illustrated embodiment includes two mold parts 20 and 22 that close to define at least one mold cavity 24 for forming at least one molded edge M on the fabric F (See FIGS. 1, 13 and 15). The number of mold parts and mold cavities may vary. As can be seen, the illustrated molding assembly 14 is a vertical molding assembly having a bottom mold part 20 and a movable top mold part 22 carried by a vertical press 21. Although mold part 20 of this embodiment does not move vertically when bringing the two mold parts 20 and 22 together, it is configured to shuttle horizontally to facilitate loading and stretching of the fabric F. Although not shown, mold part 20 may be mounted on a carriage capable of moving mold part 20 out from the beneath mold part 22 so that it is easily accessible for purposes, such as loading the fabric F, stretching the fabric F and removing the finished part after molding. For example, mold part 20 may be mounted on a pair of guide tubes (not shown) and a hydraulic cylinder (not shown) may be used to selectively move mold part 20 along the guide tubes. The configuration of the molding assembly, such as orientation and location of the movable mold part, may vary from application to application as desired. In the illustrated embodiment, the mold parts 20 and 22 cooperatively define two spaced apart mold cavities 24 for forming molded edges M on opposite edges of the fabric F, but the number, location and configuration of mold cavities may vary. In the illustrated embodiment, the distance between the two mold cavities 24 is fixed, thereby providing a mechanism for molding two edges M that are a fixed distance apart from one another (See FIG. 18). As described in more detail below, the illustrated embodiment is configured to allow edges to be molded on fabric that has a width that is equal to or great than the fixed distance between the mold cavities 24.

Figure 7:
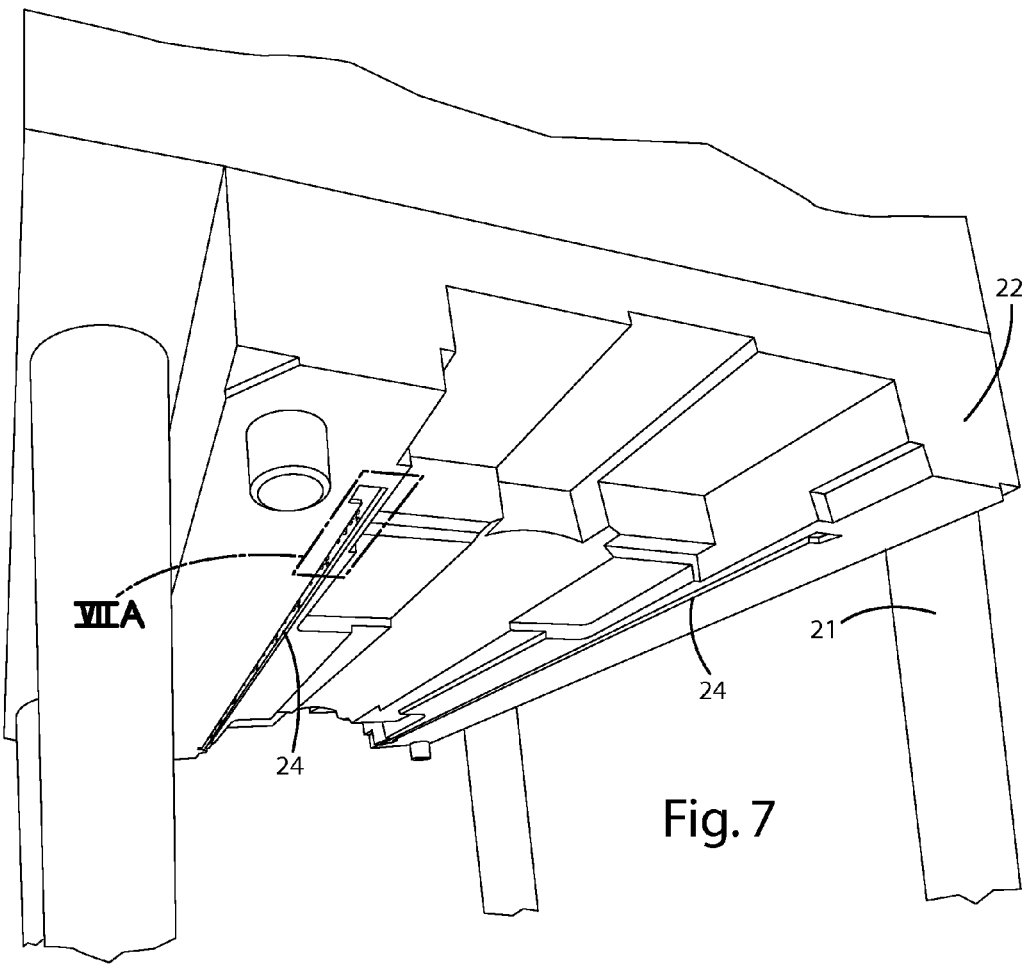
FIG. 7 is a perspective view of the vertical press and associated mold part.
Figure 7A:
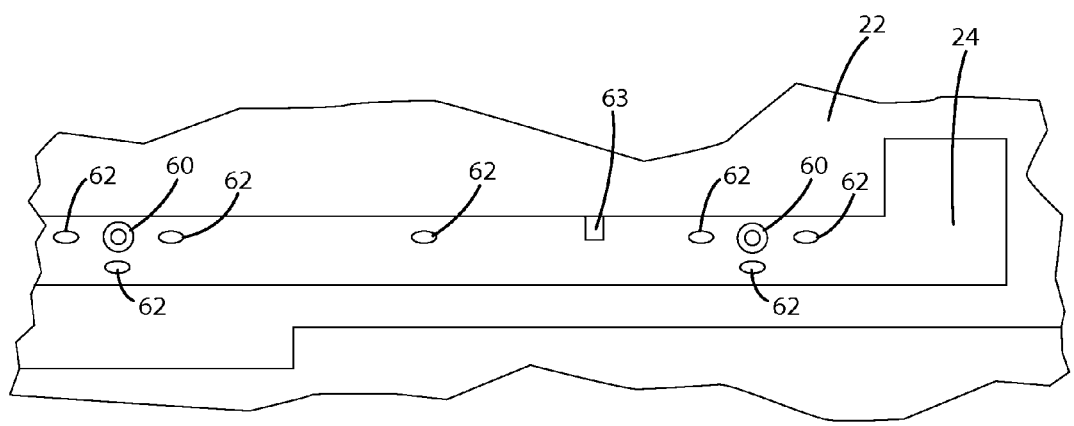
FIG. 7A is an enlarged view of a portion of the mold part showing a segment of the mold cavity.

The apparatus 10 of the illustrated embodiment is configured to form the molded edges with the fabric extending along the surface of the molded edges M where it is embedded but largely visible. The gates 60 of the molding apparatus 14 are configured to assist in holding the fabric F against the surface of the mold to produce a finished part with the fabric extending along the surface of the molded edges. Referring now to FIGS. 7 and 7A, mold part 22 may include a plurality of gates 60 for introducing resin into the mold cavity 24. The gates 60 of the illustrated embodiment are positioned in a mold surface opposite the mold surface against which the fabric F is to be located. Further, the gates 60 may extend generally perpendicularly to the mold surface against which the fabric F is to be located. As such, molten material introduced through the gate 60 helps to urge the fabric F against the desired mold surface. The gate size in the illustrated embodiment is 0.060 inches. In the illustrated embodiment, mold part 22 includes gates 60 spaced generally uniformly along the length of the mold cavity 24 no more than 18 inches apart from one another. The number, size, spacing and location of gates 60 may vary from application to application, but it has been determined that properly balancing these characteristics (along with other characteristics of the molding apparatus 14) can help to keep the fabric F on the surface of the molded edge M. For example, the type of resin and/or the cross-sectional shape and area of the mold cavities may dictate closer spacing between the gates 60. Because the molded edge M of the illustrated embodiment of this embodiment is intended to be fitted into a channel in a frame under tight tolerances, it is desirable to ensure that any vestiges left by the gates 60 do not extend above the part surface where they can interfere with installation of the molded edge M in the channel. As a result, the gates 60 of the illustrated embodiment are configured to protrude into the mold cavity 24 a small distance so that any vestiges are recessed below the surface of the molded edge M. In the illustrated embodiment, the gates 60 are rounded to provide a small concave recess in the molded edge M to seat the vestiges (See FIG. 17).

Referring now to FIG. 7A, mold part 22 of the illustrated embodiment also includes hold-down pins 62 for holding the fabric F against the opposite mold surface. As shown, mold part 22 may include three hold-down pins 62 arranged around each gate 60 and additional hold-down pins 62 located between the gates 60. The number and location of the hold-down pins may vary from application to application as desired. The hold-down pins 62 may be oval in cross-section and oriented with their greatest dimension aligned with the direction of flow of molten resin through the mold. In use, the oval pins 62 may produce less turbulence in the molten resin as the resin flows from the gates to fill the mold cavity 24. The size and cross-sectional shape of the hold-down pins may vary from application to application as desired. The shut-off (i.e. clearance) between the hold-down pins and mold part 20 may vary from application to application. However, in the illustrated embodiment the fabric thickness is in the range 0.030 to 0.040 inches, and the clearance is 0.013 inches. It should be noted that in this embodiment, the hold-down pin shut-off may be less than the mold shut-off where the fabric enters the mold cavity 24, which may in this embodiment be in the range of 0.012 to 0.019 inches. This holds the fabric F quite tightly helping to keep it on the part surface during the molding process. As shown in FIG. 7A, the mold cavity 24 may also include a void 63 shaped to form a locating rib on the molded edge M (as described in more detail below).

In one embodiment, one of the mold parts includes a mold pocket, which provides flexibility in the size of the fabric that is used with the mold. The mold pocket extends in a direction substantially parallel to the direction of stretch and provides space to store excess fabric. If it is desirable to mold edges on opposite sides of a fabric that is wider than the distance between the two mold cavities, the edges of the fabric can be moved toward one another to match the distance between the mold cavities and the slack (or excess fabric) that accumulates in the middle of the fabric can be moved into the mold pocket where it will be out of the way when the mold parts close. The mold pocket allows for the encapsulated distance of two edges to be easily adjusted without expensive tooling changes. This is particularly useful in applications where the width between encapsulated edges effectively determines the stiffness of the fabric (once assembled on the chair) and ultimately the chair comfort.

In the illustrated embodiment, mold part 20 defines a mold pocket 28 extending roughly along the center of mold part 20 generally parallel to the mold cavities 24 (See FIGS. 1, 3 and 10). In the illustrated embodiment, the mold pocket 28 is configured to receive slack fabric S along the entire length of the fabric F. The size, shape and configuration of the mold pocket 28 may vary from application to application as desired.

Figure 14:
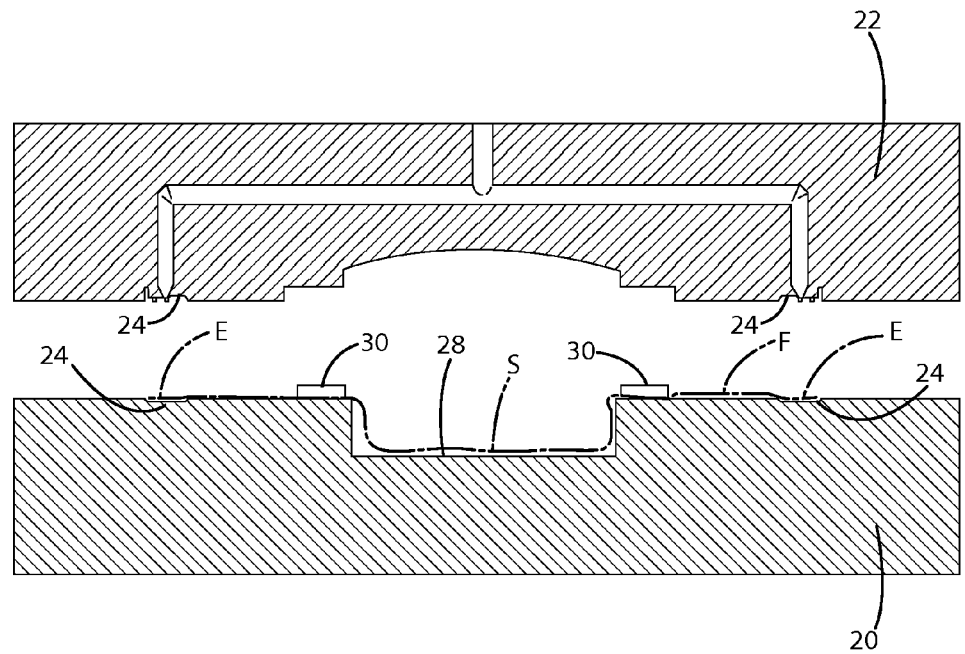
FIG. 14 is a cross-sectional view taken along line 14-14 of FIG. 13.

In the illustrated embodiment, one or more magnets 30 can be used to assist in retaining the slack fabric S in the mold pocket 28. More specifically, a plurality of magnets 30 are placed on mold part 20 over the fabric F after the slack S has been moved in the mold pocket 28 (See FIGS. 12 and 14). The fabric F is sandwiched between and clamped by the magnets 30 and mold part 20. In this way, the magnets 30 keep the excess fabric S in the mold pocket 28 where it will not be in the way during the molding process. As shown, the illustrated embodiment uses six magnets 30 to secure the excess fabric in the mold pocket 28—three magnets 30 along each side of the mold pocket 28. In this embodiment, the magnets 30 are placed on the stationary mold part 20 and the moving mold part 22 is shaped to accommodate the magnets 30. For example, the moving mold part 22 may be shaped to define one or more space (such as bores) that fit over the magnets 30 when mold parts 20 and 22 are closed. The magnets 30 used in the molding process secure fabric to assist in ensuring that the monofilaments edges stay inside the mold cavities 24.

Although not shown, the molding assembly may include fabric locating features, such as blocks or graphics, to ensure fabric corners are in correct place as this controls the final location of the encapsulating edge. If used, the locating blocks or locating graphics may be disposed on mold part 20 and may provide a physical structure or visual guide against which the fabric F can be placed in one or both of the "x" and "y" directions. Locating blocks or locating graphics may be provided to locate all four corners of the fabric F.

Figure 19:
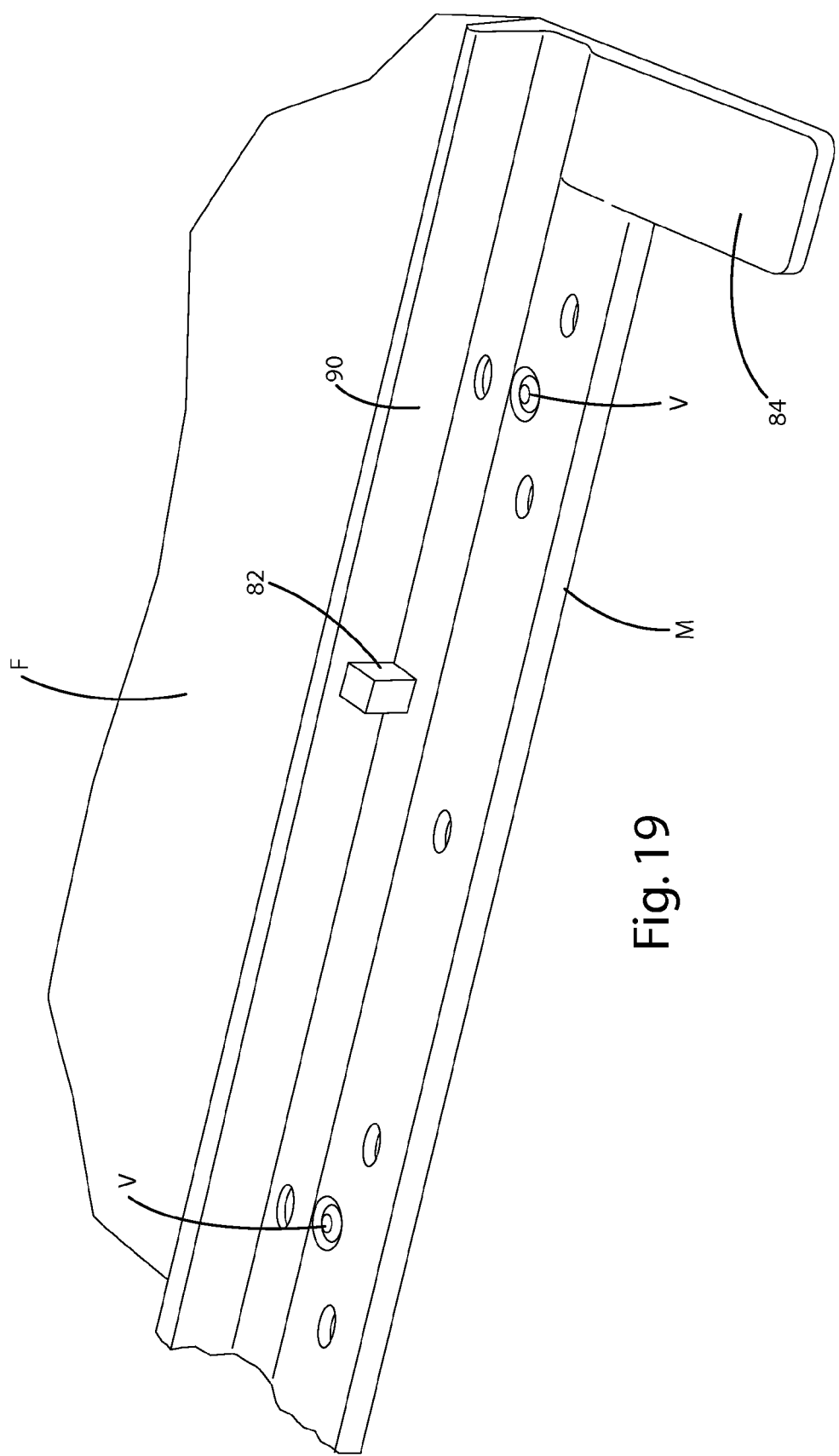
FIG. 19 is an enlarged perspective view of a portion of the molded edge taken from region XIX of FIG. 18.

In the illustrated embodiment, the molded edge M includes tabs or other indices to facilitate proper mounting of the load bearing surface on a support structure (See FIGS. 18 and 19). In one embodiment, the support structure includes a frame having a pair of opposed side components that hold opposite molded edges. For example, in the context of a chair, the frame may include two "L"-shaped components that are spaced-apart from another to form left and right support structures. In this example, one leg of the "L" may form a support for the seat portion of the chair and the other leg may form a support for the back portion of the chair. Each frame component may include two halves that define a channel shaped to closely receive and trap the corresponding molded edge M. The channels in opposed side components face away from one another so that once installed the elasticity in the fabric helps to retain the molded edges in the channels. In this embodiment, the molded edge M may include tabs 84 located at opposite ends. The tabs 84 may be clamped between the frame halves to hold the molded edges M in the correct position within the frame.

In another aspect, the present invention includes an apparatus and process for cutting the fabric blank to exact size with the use of an ultrasonic head that cuts the fabric against a steel ruled die of the same shape as fabric blank. Referring now to FIG. 8, the appartus 10 includes a cutting station 100 having a cutting table 102, a steel rule 104 and an ultrasonic cutting head 106. The cutting table 102 may be a downdraft table that uses airflow to assist in holding the fabric against the table during the cutting process. The steel rule 104 of the illustrated embodiment is embedded or otherwise mounted in the cutting table 102. The steel rule 104 follows the precise peripheral shape desired for the fabric F so that the ultrasonic cutting head 106 can cut the fabric F to the desired shape by following the steel rule 104. The ultrasonic cutting head 106 of the illustrated embodiment is carried on a robotic arm 108 capable of moving the head 106 along the steel rule 104. If desired, a supply of fabric may be contained in a roll 110 positioned adjacent to the cutting table 102 so that it can be easily unrolled onto the cutting table. The cutting station 100 may be positioned adjacent to the molding assembly 14 so that cut fabric F can be easily moved from the cutting station 100 to the molding assembly 14. If desired, the apparatus 10 may include a robot or other automation equipment for moving the cut fabric F from the cutting station 100 to the stretching assembly 14. In alternatively embodiments, the fabric F may be cut after it is loaded into stretching assembly 14.

In the illustrated embodiment, the manufacturing process may done in a work cell including a vertical molding machine, fabric cutting station, injection mold with stretching clamps mounted on opposing ends with fabric pocket. The cutting station may be inline so a robot can eventually load the fabric in the mold.

In use, the load bearing fabric molding apparatus 10 may be operated in accordance with the following steps to produce a part capable of being mounted on a frame. Unless otherwise stated or necessary for proper operation, the order of steps described herein should not be interpreted to limit the invention to such order.

The fabric blank is trimmed to finished size (See FIG. 8). In the illustrated embodiment, this process includes: indexing the fabric F over cutting table 102 directly off of a fabric roll, applying downdraft to secure the fabric to table 102, moving the robot arm with the ultrasonic head 106 to its start location firmly capturing the fabric between the head 106 and the steel ruled die (about 0.030" between head and steel ruled die in this embodiment), moving the robot arm to move the ultrasonic head 106 over the path of the steel ruled die cleanly cutting the fabric F as the head 106 engages the steel ruled die. Through this process, the fabric blank is cut to exact size, which is used in this embodiment to avoid excess fabric extending beyond the finished encapsulated part (this would create a trimmed edge). The fabric blank cutting process helps to ensure that we have the blank size as dictated by the mold. This process utilizes an accurate fabric blank (since the fabric blank determines the amount of stretch when carrier is mounted to chair) unlike some prior art where stretching prior to encapsulation dictates the amount of fabric stretch when mounted to the chair frame.

The fabric F may be essentially any load bearing textile. A variety of suitable load bearing fabrics are available from Quantum Group Inc. In the illustrated embodiment, the fabric F is a woven load bearing textile having elastomeric monofilaments extending in one direction and fill yarn extending in the other. The elastomeric monofilaments may be manufactured from a COPE or other elastomer. Although the textile of the illustrated embodiment is woven, it may be knit or otherwise constructed. The fabric need not include fill yarn and may instead be produced solely from elastomeric elements. The fabric may be of a welded or non-welded construction.

Figure 11:
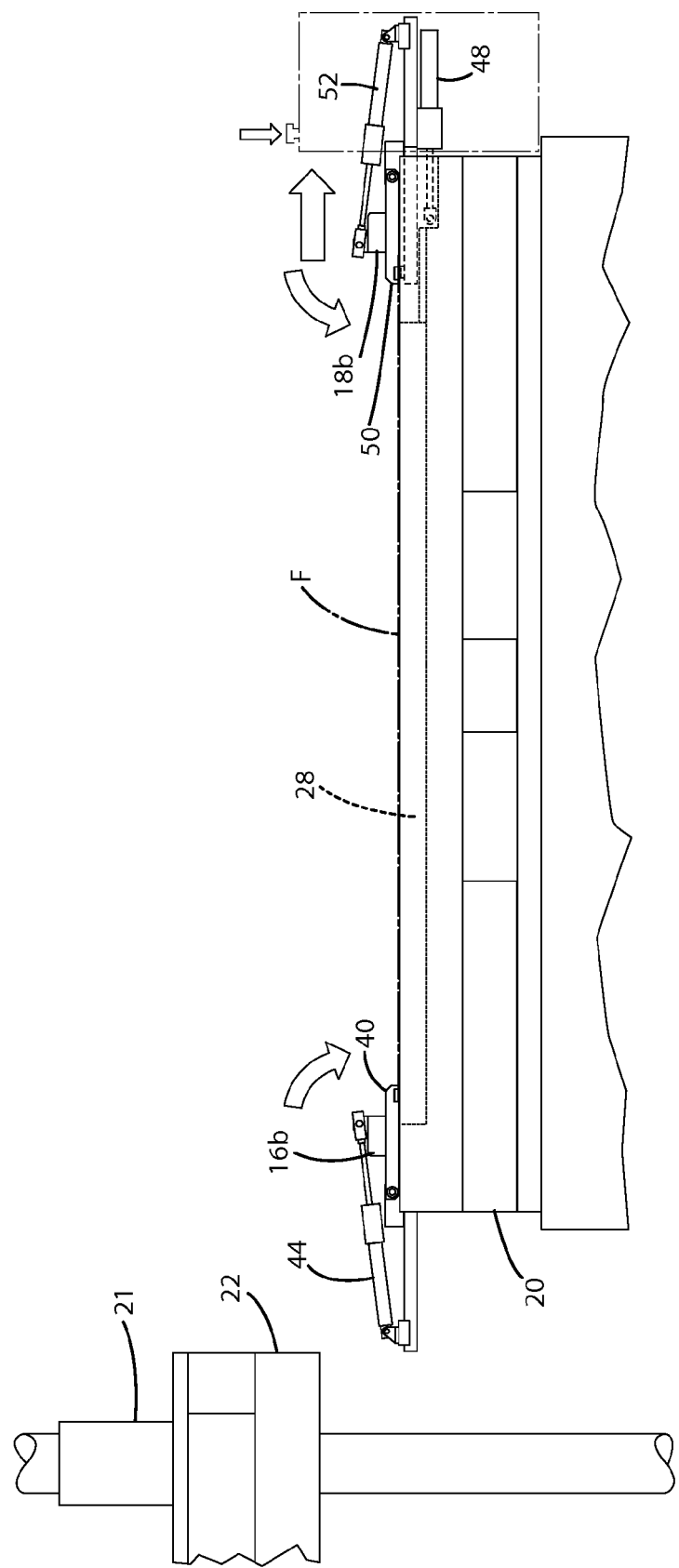
FIG. 11 is a front view of the apparatus with the fabric in the stretched position.

After cutting is completed, the operator removes the fabric blank and loads it into the next station (stretching assembly 12) (See FIGS. 9 and 11). The trimmed fabric is loaded into the stretching assembly 12. As noted above, these two steps can be reversed. More specifically, if desired, the fabric F could alternatively be trimmed after it is loaded into the stretching assembly 12. The fabric F is moved into mold location by the aid of fabric locators (not shown) in the mold. For example, mold part 20 may include visual or physical locating aids, such as lines or locating blocks, that assist in providing an operator with assistance in aligning the fabric F with the clamps 16*a-b* and 18*a-b* and mold cavities 24. In general, the fabric F is loaded by clamping one end underneath the stationary clamps 16*a-b* and clamping the other end underneath the movable clamps 18*a-b*. For example, the loading process may include the steps of: (a) locating a first corner of the fabric F under stationary clamp 16*a*, (b) closing stationary clamp 16*a* by actuating the corresponding cylinder, (c) locating a second corner of the fabric F under stationary clamp 16*b*, (d) closing stationary clamp 16*b* by actuating the corresponding cylinder, (e) locating a third corner of the fabric F under movable clamp 18*a*, (f) closing the movable clamp 18*a* by actuating the corresponding cylinder, (g) locating the final corner of the fabric F under movable clamp 18*b*, and (h) closing the movable clamp 18*b* by actuating the corresponding cylinder. Once loaded, the clamps 16*a-b* and 18*a-b* will be gripping the four corners of the fabric F with sufficient strength to allow the fabric F to be stretched the desired amount. In this embodiment, the fabric F is not clamped or otherwise grip, except for the clamps 16*a-b* and 18*a-b* located in the corners. Any slack in the fabric F is stuffed down into the mold pocket 28 (See FIG. 10). In the illustrated embodiment, the load bearing fabric F includes fill yarns extending in one direction and elastomeric monofilaments extending in the other. The fabric F is loaded into the clamps 16*a-b* and 18*a-b* in an orientation such that the fabric F is stretched in the direction in which the fill yarns run, which loads the fill yarns when the fabric F is stretched. The fabric F could be loaded into the clamps 16*a-b* and 18*a-b* in other orientations, for example, if it is desirable to apply stretch to the fabric F along another directions (such as to load the elastomeric monofilaments rather than the fill yarn).

Once the fabric F is loaded, the stretching clamps 16*a-b* are moved to apply the desire stretch (See FIG. 11). In the illustrated embodiment, this is achieved by moving the slide 46 using cylinder 48 to increase the distance between the stationary clamps 16*a-b* and the movable clamps 18*a-b*. The amount of movement may vary from application to application to provide the desired amount of stretch. In this embodiment, the stretching step causes the fabric edges to be encapsulated to be drawn tight and straight within the mold cavities 24. Because the fabric edges terminate in the mold cavities, the process results a no trim situation and provides a clean repeatable finished edge.

In some applications, the fabric F may be wider than the distance between the mold cavities 24. In such applications, the excess fabric F can be moved into the mold pocket 28 so that it does not interfere with or become damaged during the molding process. For example, the operator may manually push the slack down into the mold pocket 28 (See FIGS. 10 and 12). In the illustrated embodiment, magnets 30 are used to help retain any fabric slack in the mold pocket 28. As shown, six magnets 30 can be placed on the top surface of mold part 20 adjacent to and on opposite sides of the mold pocket 28. The number and location of magnets 30 may vary from application to application as desired.

Referring now to FIG. 13, the mold part 20 carrying the stretching assembly 12 may be shuttled into the press beneath mold part 22. This shuttling step may take place before or after the stretching step, but in the illustrated embodiment occurs after the stretch is applied to the fabric F.

Figure 16:
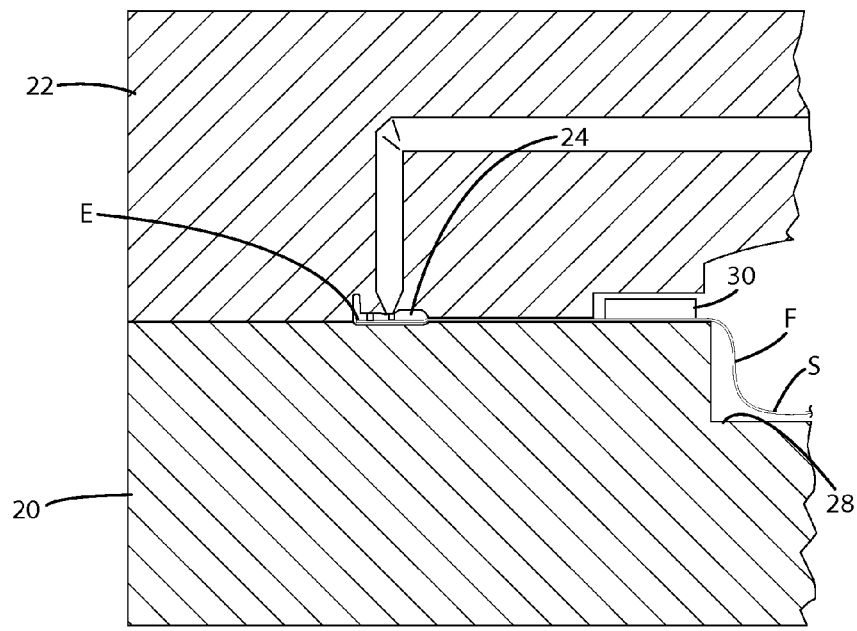
FIG. 16 is a cross-sectional view of a portion of the molding assembly taken along line 16-16 of FIG. 15.
Figure 17:
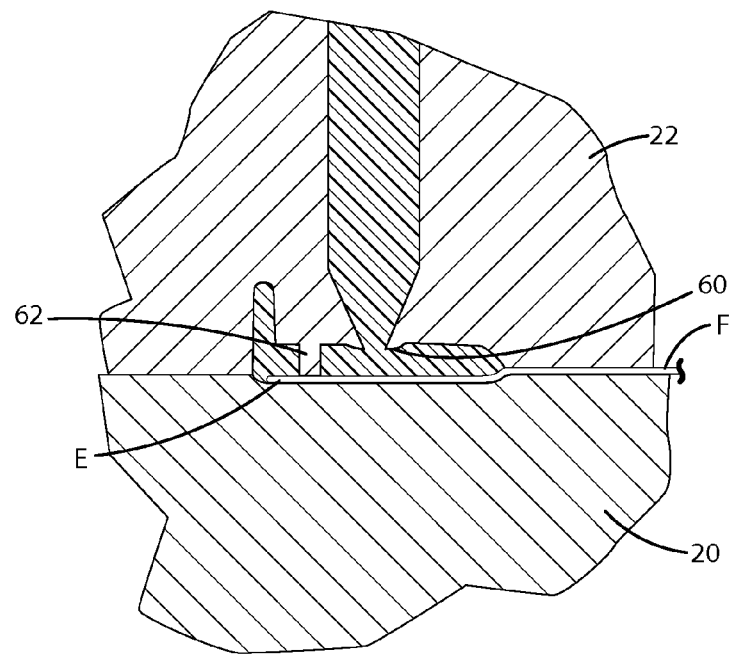
FIG. 17 is a cross-sectional view of a portion of the molding assembly showing the mold cavity.

The molding apparatus 14 is then cycled to form the molded edges M on the fabric F. More specifically, the vertical press is closed to bring mold parts 20 and 22 together to form cavities 24 (See FIG. 15). The hold-pins 62 engage the fabric F at spaced locations holding the fabric F tightly against the bottom surface of the mold cavities 24 (See FIG. 16). In addition to forming the mold cavities 24, mold part 22 of this embodiment includes voids that accommodate the magnets 30. Molten resin is introduced into the mold cavities 24, for example, using conventional techniques and apparatus. FIG. 17 shows the resin introduced into the mold cavity 24. Once the resin has been introduced and sufficient time has passed for the molded edge M to be adequately cured, the mold apparatus 14 may be opened by lifting mold part 22 away from mold part 20. After the molding apparatus 14 has been opened, mold part 20 may be shuttled back out from beneath the press. The finished part (i.e. the fabric with molded edges) may be removed from the molding apparatus 14 (See FIGS. 18 and 19). In this embodiment, the fabric edges terminate within the mold cavities 24 so no additional work, such as trimming, is needed to provide a complete fabric/carrier combination. In the illustrated embodiment, the molded edge M is formed from a TPE, such as a COPE available from DSM under the tradename "Arnitel." The molded edge M may, however, be formed from other elastomeric materials capable of retaining the fabric F under load.

Figure 20A:
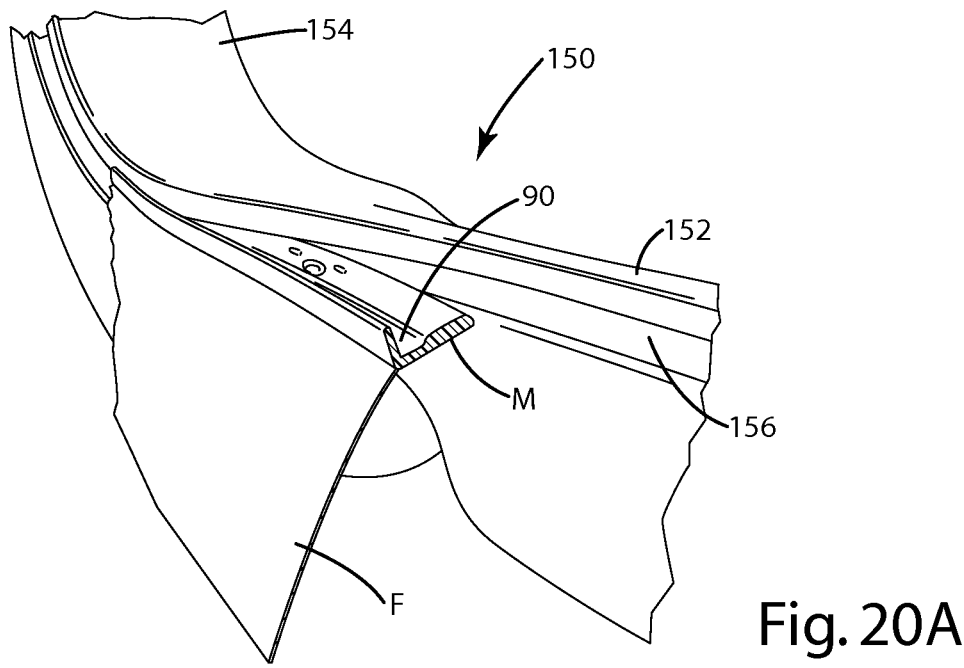
FIG. 20A is a perspective view showing the molded edge being inserted into the channel in one side of a frame.
Figure 20B:
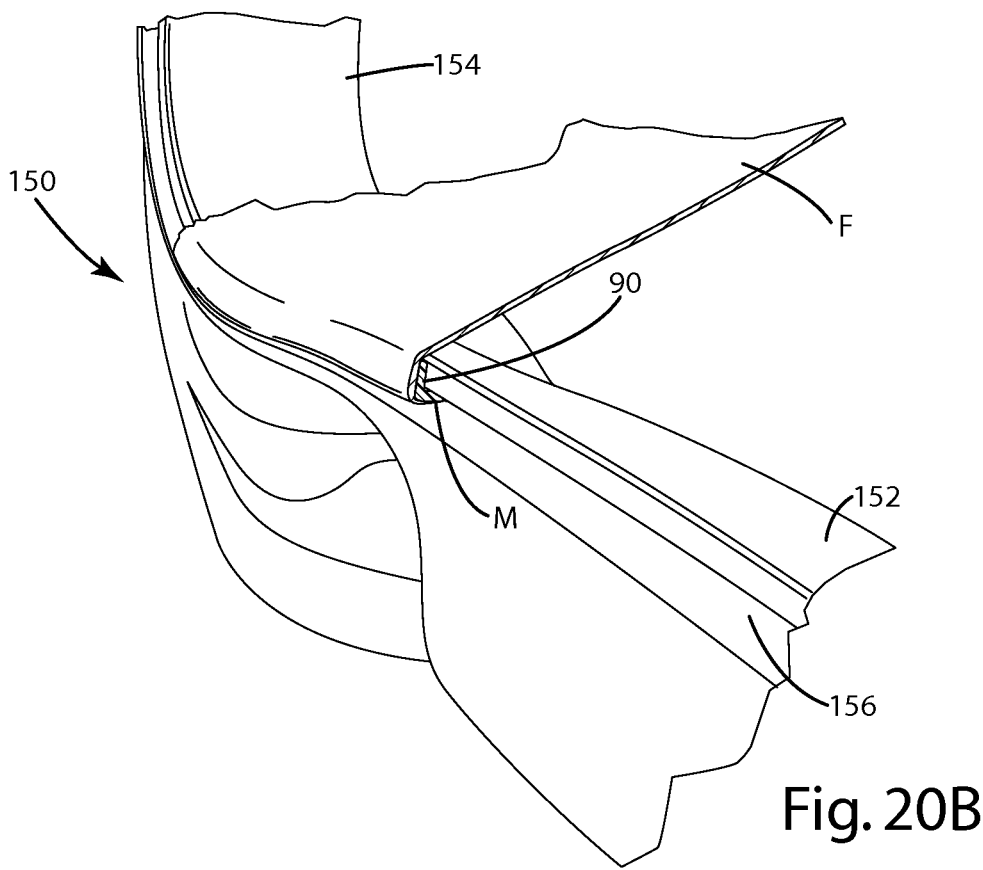
FIG. 20B is a perspective view showing one side of the frame with the fabric drawn tight.

The finished part may be installed on a frame, such as a chair frame having two frame halves that can receive the molded edges M. FIGS. 20A and 20B show a portion of a chair frame 150, including a portion of the frame in the seat region 152 that curves upwardly to form a portion of the back region 154. The frame 150 may include a mirror-image component on the opposite side of the chair to receive the other molded edge M. The finished part is installed by fitting one molded edge M into one side of the frame 150 and then fitting the other molded edge M into the opposite side of the frame. Because it is typically desirable for the fabric to be held on the frame under tension, it may be necessary to stretch the fabric F when inserting the second molded edge M into the opposite side of the frame. The width of the fabric F and the distance between opposite sides of the frame can be set to control the amount of stretch in the side-to-side direction (e.g. the direction in which the elastomeric monofilaments extend).

To facilitate installation, the molded edges M may be formed with locating features, such as locating rib 82 shown in FIG. 19. The locating ribs 82 may be positioned to mate with corresponding locating slots in the frame components. So, in use, the operator may initiate installation of a molded edge M by first fitting the locating rib 82 into the locating slot (not shown) in the frame 150. The remainder of the molded edge M may then be inserted into the channel 156 in the frame 150. Once the molded edge M is inserted, the frame halves may be clamped together to firmly grip the tabs 84 located at opposite ends of the first molded edge M. Although the illustrated embodiment includes a locating rib 82 on the molded edge M and a locating slot in the frame, the configuration may be reversed, if desired. For example, the locating rib may be located on the frame and the locating slot may be defined in the molded edge M. FIG. 19 also shows the vestiges V from the molding process. As noted above, the gates 60 protrude into the mold cavities 24 a small distance so that the vestiges are recessed below the surface of the molded part where they will not interfere with insertion of the molded edges M into the channels.

The second molded edge M may then be inserted into the frame 150 on the opposite side. Pulling the second molded edge M far enough to allow its insertion into the channel in the frame will typically require a significant amount of stretch to be applied to the elastomeric monofilaments. This may require some form of automation, such as a hydraulically actuated jig. Again, the insertion process may begin by fitting the locating rib 82 on the second molded edge M into a corresponding slot in the frame. Once the second molded edge M is inserted, the frame halves may be clamped together to firmly grip the tabs 84 to help retain the second molded edge M in the frame 150.

In some applications, the molded edge M may be formed from a material that is less abrasive to the fabric F than the material of the frame 150. In such applications, it may be desirable to provide the molded edge M with features to prevent the fabric F from riding on the surface of the frame to protect the fabric from abrasive wear. As shown in FIG. 20B, the molded edges M of the illustrated embodiment each include a lip 90 that protects the fabric F from wear against the frame 150. As shown, the lip 90 extends upwardly from the molded edge M to provide a surface against which the fabric may ride during use of the chair.

In the illustrated embodiment, the molding apparatus is configured so that in the completed part the fabric extends along the surface of the molded edges. Although optional, having the fabric extend along the surface of the mold cavity provides some potential advantages. The load bearing fabric may include fill yarn extending in one direction and elastomeric monofilaments extending in the other direction. It is possible for excessive heat in the mold to cause the elastomeric monofilaments in the fabric to melt. This could reduce the embedded strength of the fabric, for example, by increasing the risk of the fabric tearing away from the molded edge when placed under a load. By having the fabric run along the surface of the molded edge, the elastomeric portions of the fabric are protected to a certain degree from the heat of the molten resin being injected into the mold. The portion of the resin closest to the mold surface generally cools the soonest and therefore is less likely to damage the fabric. So, having the fabric on the surface allows the use of a hotter melt front. Also, running the fabric along the surface of the molded edge may increase the strength of the bond because the portion of the resin closest to the mold forms the skin of the resin, which has superior characteristics to the interior portion of the resin. Fabric along the surface also provides an advantage because it allows the finished part to be visually inspected for fabric adhesion. Further, fabric on the surface is an advantage because the embedded strength of the fabric is also a function of the fabric's embedded distance and this can be visually measured instead of destructive pull out testing as there is correlation between the lengths of embedded fabric and pull out force. As another example, fabric on the surface is an advantage because in situ fabric has the highest pull out strength when there are no wrinkles, folds or aberrations in the fabric, which prevent the resin from reaching every monofilament. There are also aesthetic benefits to having the fabric on surface because it means the opposite and adjacent surfaces do not have fabric showing and thus can function as "show surfaces."

In another aspect, the apparatus may be configured to provide a different amount of stretch to different portions of the fabric. This allows isolation of different regions of the fabric. For example, it may be desirable to stretch the end portions of the fabric to a greater degree than the center portion of the fabric. This may be useful for aesthetic or functional reasons. In the illustrated embodiment, the fabric is stretched more at the top and bottom leading edges (where fabric is not attached to the frame) to reduce the possibility that the fabric will wrinkle. With one-zone stretching (as described above), the fill yarn is stretched throughout the entire fabric to the degree desired to address wrinkling for top/bottom free edges, which is tighter than would be otherwise be desired for, the sitting region (e.g. central region) and could therefore be overly stiff for some applications.

An embodiment showing this aspect of the present invention is shown in FIGS. 22-27. The illustrated embodiment includes a two-zone stretching assembly 212 carried on mold part 220. The stretching assembly 212 is generally similar to the one-zone stretching assembly 12 described above, except that: (a) it includes a second set of clamps and (b) both pairs of corner clamps are movable. The stretching assembly 212 may be incorporated into load bearing surface molding apparatus 10 described above in place of stretching assembly 12 to form a complete load bearing surface molding apparatus.

Figure 22:
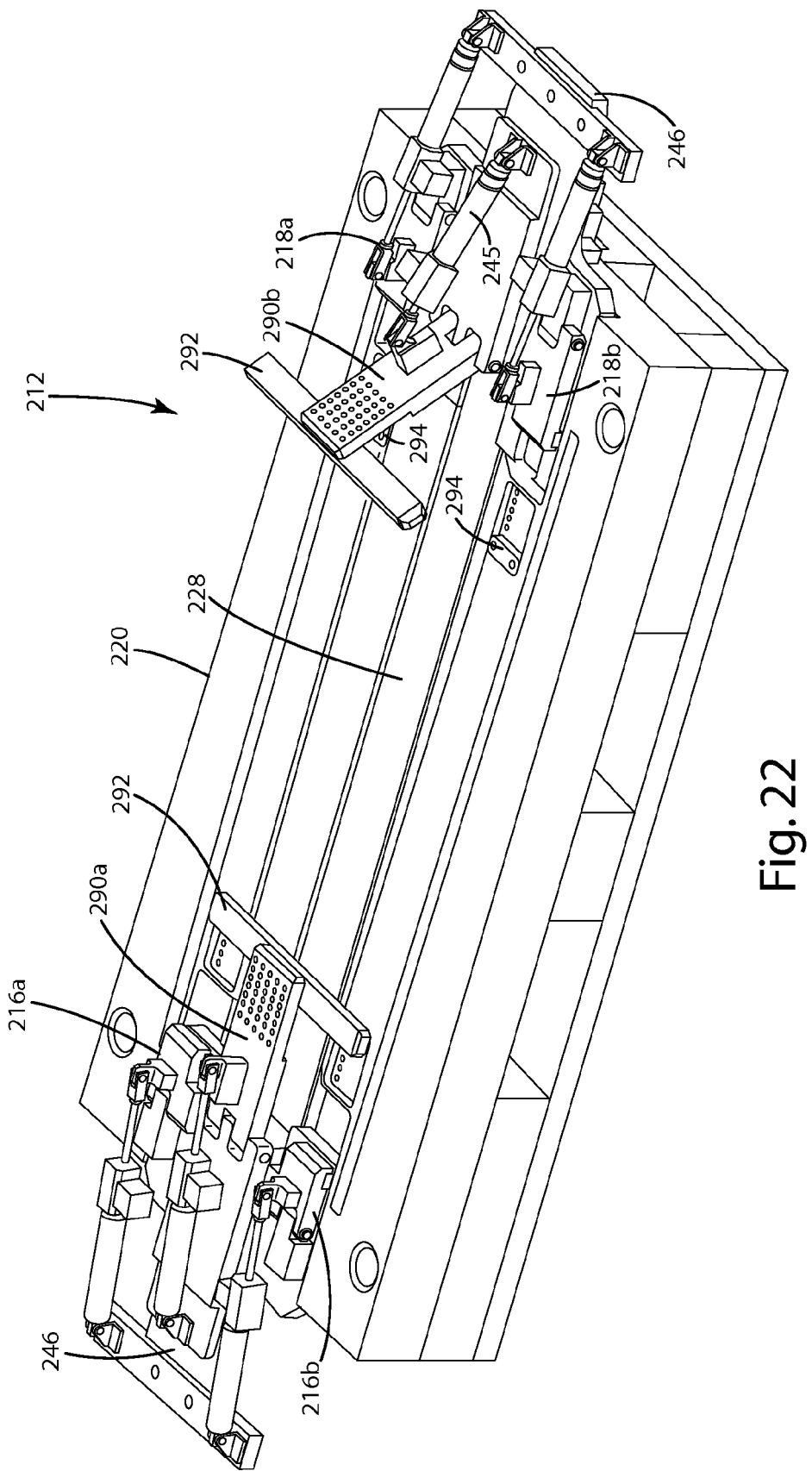
FIG. 22 is a perspective view of an alternative stretching assembly carried on a mold part.
Figure 23:
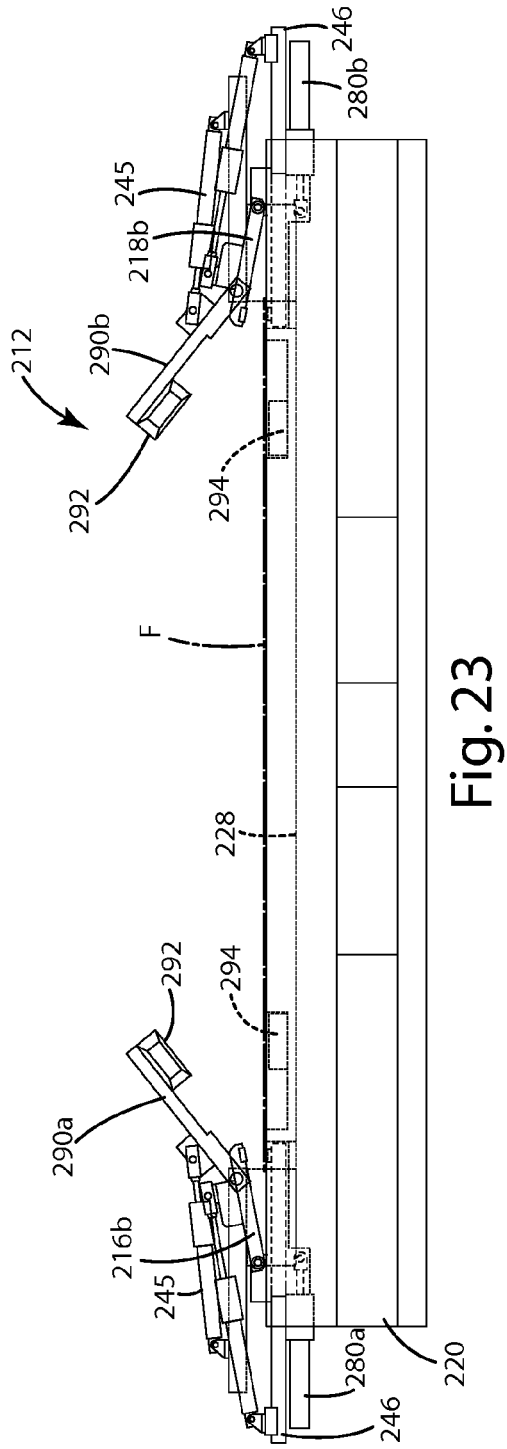
FIG. 23 is a front view of the alternative stretching assembly with the center and corner clamps open.
Figure 24:
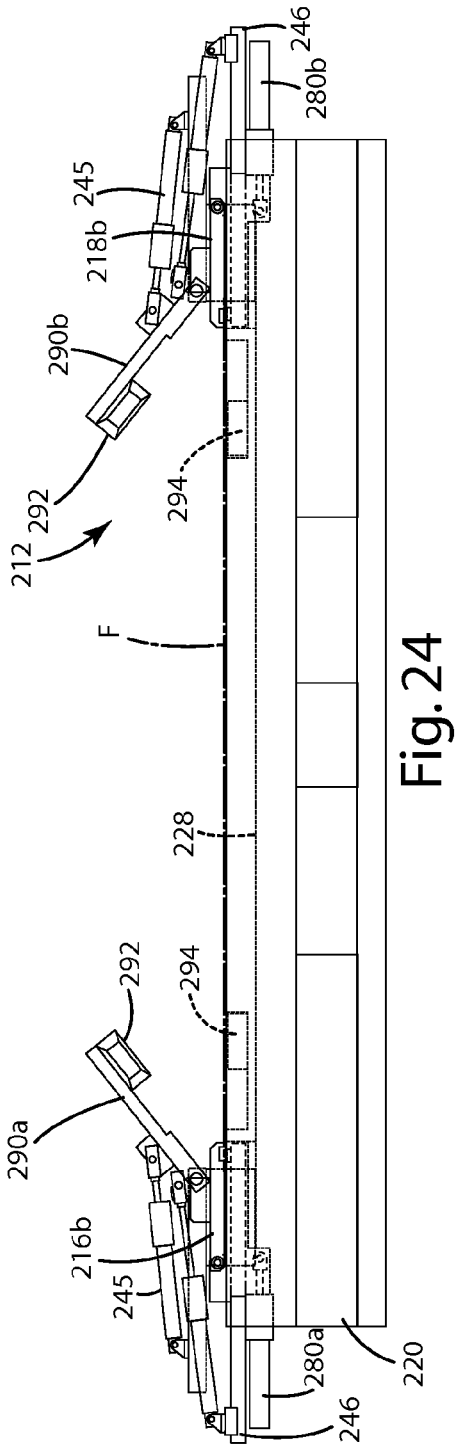
FIG. 24 is a front view of the alternative stretching assembly with the center clamps open and the corner clamps closed.

FIG. 22 is a perspective view of the stretching assembly 212 and the lower mold part 220. Each end of the stretching assembly 212 includes corner clamps 216a-b and 218a-b and a center clamp 290a-b. FIG. 22 shows corner clamps 216a-b and center clamp 290a in their closed positions (e.g. fabric gripping positions) and corner clamps 218a-b and center clamp 290b in their open position (e.g. ready to receive fabric). The corner clamps 216a and 216b grip and hold the fabric F in the same manner as described above in connection with the one-zone embodiment. Both sets of corner clamps 216a-b and 218a-b are mounted to a slide mechanism 246 that allows the clamps 216a-b and 218a-b to move apart to apply stretch to the fabric F. The slide mechanisms 246 are movably mounted to mold part 220 for reciprocating motion between extended and retracted positions. In this embodiment, the slide mechanisms 246 are driven by hydraulic or pneumatic cylinders (See cylinders 280a-b in FIG. 23). The amount of movement in the hydraulic cylinders 280a-b may be selectively varied to control the amount of stretch applied to the fabric F.

The center clamps 290a-b are mounted to mold part 220 and are capable of being selectively opened and closed to selectively hold the fabric F (compare center clamp 290a and center clamp 290b in FIG. 22). In this embodiment, the center clamps 290a-b are configured to close on the fabric F after it has been stretched to the degree desired in the central region. In this embodiment, the center clamps 290a-b are opened and closed by hydraulic or pneumatic cylinders 245. In this embodiment, the center clamps 290a-b are positioned to close on the fabric F at the desired dividing lines between the central region A (i.e. the region to receive less stretch) and the end regions B and C (i.e. the regions to receive additional stretch). However, the center clamps 290 may be configured to engage the fabric F in essentially any location desired in a given application. Although they open and close, the center clamps 290a-b of this embodiment are in a fixed position in the sense that do not move with the corner clamps 216a-b and 218a-b as the corner clamps 216a-b and 218a-b extend and retract. To provide some flexibility, the center clamps 290a-b may include adjustable heads 292 and 294. The heads 292 and 294 may be moved to any of the various mounting locations (shown as circular openings in FIG. 22) to allow some adjustment in the dividing line between the different regions of stretch. For example, heads 292 may be bolted to the center clamps 290 using any of the illustrated sets of bolt holes, and heads 294 may be bolted to mold part 220 using any of the illustrated sets of bolt holes.

The general steps in the process of using two-zone stretching assembly will now be described in connection with FIGS. 23-27. The fabric blank may be cut to the desired size, for example, using the cutting assembly described above in connection with apparatus 10. The fabric blank is loaded into the stretching assembly 212 using essentially the same process as described above in connection with apparatus 10 (See FIG. 23). This includes clamping the fabric F using the corner clamps 216a-b and 218a-b (See FIG. 24). Once the fabric is gripping in the corners, the corner clamps 216a-b and 218a-b are moved apart to apply the stretch desired (e.g. 3-4%) in the central region A (i.e. region between center clamps) of the entire fabric (See FIG. 25). This stretch can be applied by moving both pairs of clamps or just one pair. After central region A has been stretched, the center clamps 290a-b are closed to secure the central region A' at the current amount of stretch and separate the central region A' from the end regions B and C (See FIG. 26). After the center clamps 290a-b are closed, the corner clamps 216a-b and 218a-b can be moved farther apart to apply additional stretch to the fabric F. With the center clamps 290a-b firmly clamping the fabric F, the additional stretch applied by the corner clamps 216a-b and 218a-b is localized on the end regions B and C of the fabric outwardly from the center clamps 290a-b. The corner clamps 216a-b and 218a-b can be moved to apply the desired stretch to the end regions B and C, thereby creating elongated end regions B' and C' (See FIG. 27). Both pair of corner clamps 216a-b and 218a-b can be moved the same amount if it is desirable for both end regions B and C to have the same stretch. Alternatively, each pair of clamps 216a-b and 218a-b may be moved different amount if it is desirable for the end regions B and C to have different amounts of stretch. Although the corner clamps 216a-b and 218a-b are extended farther in this embodiment, the corner clamps 216a-b and/or 218a-b could be retracted in this stage to create end regions that are stretched less than the central region A'. If there is any slack in the fabric F, the slack may be moved into the mold pocket 228 and, if desired, magnets (not shown) can be applied to retain the fabric in the mold pocket 228. Once the second stretch is applied and any desired action concerning slack has been taken, the molded edges can be formed onto the stretched fabric in essentially the same manner discussed above in connection with apparatus 10. In short, mold part 220 is shuttled into the press so that the molded edges M can be formed on the fabric while the center clamps 290*a-b* and corner clamps 216*a-b* and 218*a-b* hold the fabric F in the stretched condition. The shuttling and molding steps may be essentially identical to those discussed above in connection with apparatus 10 and therefore will not be described in detail. Suffice it to say that the mold part may be moved into position under the moving mold part, the moving mold part may be closed onto mold part 220 and resin may be introduced into the mold cavities. Once the resin has sufficiently cured, the mold may be opened and the finished part removed.

Although referred to as a "two zone" stretching assembly, the apparatus can create three different zones of stretch because each end region can be at a different stretch. More specifically, corner clamps 216*a-b* may be moved a different distance than corner clamps 218*a-b* after the center clamps 290 have been closed.

Also, the center clamps 290*a-b* need not be actuated simultaneously, but rather can be closed at different times to allow a variety of stretching options. For example, in one alternative embodiment, the corner clamps 216*a-b* and 218*a-b* may be extended to stretch the fabric to a first tension, a single center clamp 290*a* may be closed, the corner clamps 216*a-b* or 218*a-b* farthest from the closed center clamp 290*a* may be further extended to add additional stretch to central region and one end region of the fabric, the other center clamp 290*b* can be closed and the same corner clamps 216*a-b* or 218*a-b* can be extended again to apply an even greater amount of stretch to the corresponding end region of the fabric. If desired, one or both set of corner clamps 216*a-b* or 218*a-b* can be retracted (rather than extended) after the central clamps 290*a-b* are closed to reduce the amount of stretch in one or more end regions.

Further, the present invention can be modified to include additional clamps that can be used to create an even greater number of separately stretchable regions.

In the illustrated embodiments, the movable corner clamps 16*a-b*, 216*a-b* and 218*a-b* are described in pairs that are carried on commons slide and extend/retract together. If desired, each of the movable corner clamps 16*a-b*, 216*a-b* and 218*a-b* could be mounted on a separate slide, thereby allowing different degrees of stretch on opposite sides of the fabric.

This disclosure provides a description of various embodiments of the invention. It is not intended to limit the present invention to the described embodiments or to specific elements illustrated or described in connection with this embodiment. Various alterations and modifications may be made without departing from the scope of the invention. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiment includes a plurality of features that are described in concert and that cooperatively provide a collection of benefits. The present invention is not limited to only those embodiments that include all of these features or that provide all of the stated benefits, but rather extends to any embodiment that includes any one or more of these features or benefits.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. An apparatus for molding a molded edge onto a fabric comprising:
   a molding apparatus having a plurality of mold parts cooperatively defining a pair of spaced-apart mold cavities;
   a fabric stretching apparatus having a plurality of clamps, said clamps including a first pair of clamps configured to grip one end of the fabric and a second pair of clamps configured to grip a second end of the fabric, at least one of said first pair of clamps and said second pair of clamps being selectively movable to increase a distance between said first pair of clamps and said second pair of clamps whereby said fabric is stretched as a result of said movement, said first pair of clamps including two clamps spaced apart from one another such that a central portion of the fabric between said first pair of clamps is free, said second pair of clamps including two clamps spaced apart from one another such that a central portion of the fabric between said second pair of clamps is free,
   wherein the clamps of the first pair of clamps are adjacent to and aligned with one another and the clamps of the second pair of clamps are adjacent to and aligned with one another opposite the first pair of clamps,
   wherein said first pair of clamps and said second pair of clamps are aligned with said mold cavities such that opposite edges of the stretched fabric terminate within said mold cavities, and
   wherein at least one of said mold parts includes a mold pocket for storing slack fabric.

2. The apparatus of claim 1 wherein said first pair of clamps and said second pair of clamps are aligned with said spaced-apart mold cavities such that the stretched fabric is held within said spaced-apart mold cavities.

3. An apparatus for molding a molded edge onto a fabric comprising:
   a molding apparatus having a plurality of mold parts cooperatively defining a pair of spaced-apart mold cavities, at least one of said mold parts including a mold pocket for storing slack fabric;
   a fabric stretching apparatus having a plurality of clamps, said clamps including a first pair of clamps configured to grip one end of the fabric and a second pair of clamps configured to grip a second end of the fabric, at least one of said first pair of clamps and said second pair of clamps being selectively movable to increase a distance between said first pair of clamps and said second pair of clamps whereby said fabric is stretched as a result of said movement, said first pair of clamps including two clamps spaced apart from one another such that a central portion of the fabric between said first pair of clamps is free, said second pair of clamps including two clamps spaced apart from one another such that a central portion of the fabric between said second pair of clamps is free, and wherein said first pair of clamps and said second pair of clamps are aligned with said mold cavities such that opposite edges of the stretched fabric terminate within said mold cavities, and including a plurality of magnets, said magnets being disposed adjacent said mold pocket to retain slack fabric within said mold pocket.

4. The apparatus of claim 1 further including at least one intermediate clamp operable separately from said first pair of clamps and said second pair of clamps, said intermediate clamp being capable of selectively clamping the fabric to allow multi-zone stretching.

5. The apparatus of claim 1 wherein at least one of said mold parts includes a plurality of hold-down pins for holding the fabric against a surface of at least one of said mold cavities.

6. A molding apparatus for molding a carrier onto a fabric comprising:

a fabric stretching apparatus having a first pair of spaced apart clamps configured to grip one end of the fabric, a portion of the fabric between each of the clamps of the first pair of clamps being free, and a second pair of spaced apart clamps configured to grip a second end of the fabric, a portion of the fabric between each of the clamps of the second pair of clamps being free, at least one of said first pair of clamps and said second pair of clamps being selectively movable to increase a distance between said first pair of clamps and said second pair of clamps; and a molding apparatus having a plurality of mold parts cooperatively defining a first mold cavity and a second mold cavity, said first mold cavity being spaced apart a fixed distance from said second mold cavity, at least one of said mold parts defining a mold pocket between said first mold cavity and said second mold cavity, whereby said mold pocket may receive any slack that may form in the fabric as opposite edges of the fabric are disposed within said first mold cavity and said second mold cavity, wherein said stretching apparatus is carried on said mold part defining said mold pocket, and wherein said first pair of clamps is movable mounted to said mold part defining said mold pocket.

7. The apparatus of claim 6 wherein said mold part defining said mold pocket is movable between a first position beneath a vertical press and a second position out from beneath said vertical press.

8. The apparatus of claim 7 wherein said spaced-apart mold cavities defining a cavity which is shaped to define a locating feature on the carrier.

9. The apparatus of claim 8 wherein at least one of said mold parts includes a plurality of gates extending into said at least one of the spaced-apart mold cavities and a plurality of hold-down pins for holding the fabric against a surface of the at least one of said spaced-apart mold cavities.

10. An apparatus for molding a molded edge onto a fabric having a first edge and an second edge opposite the first edge, the apparatus comprising:

first and second spaced apart clamps disposed along the first edge such that a portion of the edge between the first and second spaced apart clamps is unclamped;

third and fourth spaced apart clamps disposed along the second edge opposite the first and second spaced apart clamps such that a portion of the edge between the third and fourth spaced apart clamps is unclamped;

stretching means configured to cooperate with one or both of the first and second spaced apart clamps and the third and fourth spaced apart clamps so as to increase a distance between the first and second spaced apart clamps and the third and fourth spaced apart clamps pair wherein the fabric is stretched as a result of increasing the distance;

a mold including a plurality of mold parts cooperatively defining a first mold cavity and a second mold cavity spaced apart from one another; and a mold pocket between the first mold cavity and the second mold cavity configured to receive any slack that may form in the fabric as opposite edges of the fabric are disposed within the first mold cavity and the second mold cavity.

11. The apparatus of claim 10 wherein the stretching means includes at least one cylinder for moving the first and second spaced apart clamps relative to the third and fourth spaced apart clamps.

12. The apparatus of claim 11 wherein the stretching means includes at least one cylinder for moving the third and fourth spaced apart clamps relative to the first and second spaced apart clamps.

* * * * *